United States Patent
Francois et al.

(10) Patent No.: US 12,022,091 B2
(45) Date of Patent: Jun. 25, 2024

(54) METADATA ALLOWING DECODING AND DISPLAYING PROCESSES ENERGY AND QUALITY CONTROL

(71) Applicant: INTERDIGITAL CE PATENT HOLDINGS, SAS, Paris (FR)

(72) Inventors: Edouard Francois, Bourg des Comptes (FR); Christel Chamaret, Chantepie (FR); Erik Reinhard, Hédé-Bazouges (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 18/017,731

(22) PCT Filed: Jul. 12, 2021

(86) PCT No.: PCT/EP2021/069281
§ 371 (c)(1),
(2) Date: Jan. 24, 2023

(87) PCT Pub. No.: WO2022/017845
PCT Pub. Date: Jan. 27, 2022

(65) Prior Publication Data
US 2023/0291910 A1 Sep. 14, 2023

(30) Foreign Application Priority Data
Jul. 24, 2020 (EP) .................................. 20305851

(51) Int. Cl.
*H04N 7/12* (2006.01)
*H04N 19/127* (2014.01)
(Continued)

(52) U.S. Cl.
CPC .......... *H04N 19/156* (2014.11); *H04N 19/127* (2014.11); *H04N 19/154* (2014.11); *H04N 19/70* (2014.11)

(58) Field of Classification Search
CPC .................................................. H04N 19/127
See application file for complete search history.

(56) References Cited

PUBLICATIONS

Anonymous, "High Efficiency Video Coding", International Telecommunication Union (ITU), ITU-T Telecommunication Standardization Sector of ITU, Series H: Audiovisual and Multimedia Systems, Infrastructure of Audiovisual—Coding of Moving Video, Recommendation of ITU-T H.265, Apr. 2013, 317 pages.

(Continued)

*Primary Examiner* — Y Lee
(74) *Attorney, Agent, or Firm* — CONDO ROCCIA KOPTIW LLP

(57) ABSTRACT

A method comprising: receiving at least one bitstream comprising encoded video data and a message corresponding to said encoded video data and decoding said message, said message comprising for each coding tool of a plurality of coding tools used for encoding the video data, information representative of an energy consumed by a device in charge of decoding and/or displaying the encoded video data induced by said coding tool and information representative of an impact of said coding tool on a quality of the encoded video data after decoding; using the information comprised in the decoded message to select at least one coding tool of the plurality of coding tools to deactivate or modify; and, decoding the encoded video data by using a decoding process wherein the selected coding tools are deactivated or modified.

16 Claims, 7 Drawing Sheets

(51) Int. Cl.
*H04N 19/154* (2014.01)
*H04N 19/156* (2014.01)
*H04N 19/70* (2014.01)

(56) References Cited

PUBLICATIONS

Kranzler et al., "Decoding Energy Assessment of VTM-6.0", Joint Video Experts Team (JVET) of ITU-T SG 16 WP 3 and ISO/IEC JTC 1/SC 29/WG 11, Document: JVET-P0084, 16th Meeting, Geneva, Switzerland, Oct. 1, 2019, 9 pages.

Li et al., "Toward A Practical Perceptual Video Quality Metric", Netflix Technology Blog, Jun. 6, 2016, 23 pages.

Labasan et al., "Intel Running Average Power Limit Technology", University of the Pacific & Lawrence Livermore National Laboratory, Document: LLNL-POST-599036, 1 page.

Anonymous, "Information Technology—MPEG Systems Technologies—Part 11: Energy—Efficient Media Consumption (Green Metadata)", International Organization for Standardization & the International Electrotechnical Commission (ISO/IEC), JTC1/SC29/WG11, Document: ISO/IEC 23001-11, 64 pages. Retrieved from the Internet on Jan. 31, 2018, URL: http://phenix.int-evry.fr/mpeg/doc_end_user/documents/12I_Gwangju/wg11/w17413.zipISO IEC 23001-11 2018(E)-FDIS-2ndEd-Clean.docx.

Bossen et al., "JVET Common Test Conditions and Software Reference Configurations for SDR Video", Joint Video Experts Team (JVET) of ITU-T SG 16 WP 3 and ISO/IEC JTC 1/SC 29/WG 11, Document: JVET-M1010-v1, 13th Meeting: Marrakech, Morocco, Jan. 9, 2019, 6 pages.

Fernandes et al., "The Green Metadata Standard for Energy-Efficient Video Consumption", Institute of Electronics and Electrical Engineers (IEEE), IEEE Multimedia Magazine, vol. 22, No. 1, Jan.-Mar. 2015, 8 pages.

Khan et al., "RAPL in Action: Experiences in Using RAPL for Power Measurements", ACM Transactions on Modeling and Performance Evaluation of Computing Systems, vol. 3, No. 2 , Jan. 2018, 27 pages.

Nogues et al., "HEVC decoding with tunable image quality", International Organization for Standardization, ISO/IEC JTC1/SC29/WG11, Coding of Moving Pictures and Audio, Document MPEG2014/m35009, Strasbourg, France, Oct. 2014, 8 pages.

Wang et al., "Multi-Scale Structural Similarity for Image Quality Assessment", The Thirty-Seventh Asilomar Conference on Signals, Systems & Computers (ACSSC) Conference, Pacific Grove, California, USA, Nov. 9, 2003, 5 pages.

METADATA ALLOWING DECODING AND DISPLAYING PROCESSES ENERGY AND QUALITY CONTROL

CROSS REFERENCE TO RELATED APPLICATIONS

This application is a U.S. National Stage Application under 35 U.S.C. 371 of International Patent Application No. PCT/EP2021/069281, filed Jul. 12, 2021, which is incorporated herein by reference in its entirety.

This application claims priority to European Patent Application No. 20305851.6, filed Jul. 24, 2020, which is incorporated herein by reference in its entirety.

1. TECHNICAL FIELD

At least one of the present embodiments generally relates to a method and an apparatus for controlling an energy consumption of a video decoding and/or displaying application.

2. BACKGROUND

Reducing energy consumption is a major issue. This issue concerns many fields and in particular the field of electronic systems. The last few years have seen the emergence of video streaming applications to such an extent that this type of applications now represents a significant part of the overall consumption of electrical energy. Any solution allowing reducing the energy consumption of video streaming applications is therefore welcome since it would have an impact on said overall consumption.

At the level of an electronic system, the reduction of the energy consumption is also a key issue, especially for mobile devices with limited energy power resources. Indeed, it would allow preserving the life of batteries.

A part of the energy consumed by a video streaming application is consumed during the decoding and displaying processes of the streamed video. For instance, when a video application is activated on a smartphone, it is known that the decoding process consumes 15% of the energy while the display process consumes 50% of said energy.

Currently, the control of the energy consumed by a video decoding and/or a displaying process is rather limited. Such control is particularly counter intuitive for a decoding process which is defined in a decoder specification. Indeed, each decoder must be compliant with each coding tool defined in the decoder specification. When an coding tool was activated during the encoding of a video stream, said coding tool needs to be applied by the decoder to produce a decoded video corresponding to what have been encoded. Consequently, it is difficult to get away from the specified decoding process to control the energy consumption.

The control of the energy consumed by the display process is generally independent of the decoding process and let to display system manufacturer. This independence implies that the energy consumption of the display process depends more or less efficiently from the content of the streamed video. Consequently, the displayed video may not have the best possible quality for an energy consumption target.

It is desirable to propose solutions allowing to control jointly the energy consumed by a video decoding and/or display process and the quality of the displayed video.

3. BRIEF SUMMARY

In a first aspect, one or more of the present embodiments provide a method comprising: receiving at least one bitstream comprising encoded video data and a message corresponding to said encoded video data and decoding said message, said message comprising for each coding tool of a plurality of coding tools used for encoding the video data, information representative of an energy consumed by a device in charge of decoding and/or displaying the encoded video data induced by said coding tool and information representative of an impact of said coding tool on a quality of the encoded video data after decoding; using the information comprised in the decoded message to select at least one coding tool of the plurality of coding tools to deactivate or modify; and, decoding the encoded video data by using a decoding process wherein the selected coding tools are deactivated or modified.

In an embodiment each information is provided for at least a sub-part of the encoded video data corresponding to at least one temporal layer and/or at least one picture and/or at least one slice in a picture and/or at least one tile in a picture and/or at least one block of pixels in a picture and/or at least one block of a picture encoded according to a predetermined coding mode.

In an embodiment the information representative of an energy consumed by a device in charge of decoding and/or displaying the encoded video data induced by said coding tool is representative of an amount of reduction of an energy consumed by the device in charge of decoding and/or displaying the encoded video data when said coding tool is deactivated or modified and the information representative of an impact of said coding tool on a quality of the encoded video data after decoding is an amount of reduction of a quality of the encoded video data after decoding when said coding tool is deactivated or modified.

In an embodiment for at least one coding tool, the message comprises an information representative of an amount of reduction of an energy consumed by the device in charge of decoding and/or displaying the encoded video data when said coding tool is deactivated and an information representative of an amount of reduction of an energy consumed by the device in charge of decoding and/or displaying the encoded video data when said coding tool is modified, and an information representative of an amount of reduction of a quality of the encoded video data after decoding when said coding tool is deactivated and an information representative of an amount of reduction of a quality of the encoded video data after decoding when said coding tool is modified.

In an embodiment for at least one coding tool, the message comprises an information representative of an amount of reduction of an energy consumed by the device in charge of decoding the encoded video data when said coding tool is deactivated and an information representative of an amount of reduction of an energy consumed by the device in charge of decoding the encoded video data when said coding tool is modified and, an information representative of an amount of reduction of an energy consumed by the device in charge of displaying the encoded video data when said coding tool is deactivated and an information representative of an amount of reduction of an energy consumed by the device in charge of displaying the encoded video data when said coding tool is modified.

In an embodiment the plurality of coding tools comprises a deblocking filter, a SAO, coding tools of the family of using weightings of at least one predictor and inverse mapping.

In a second aspect, one or more of the present embodiments provide a device comprising electronic circuitry adapted for: receiving at least one bitstream comprising encoded video data and a message corresponding to said encoded video data and decoding said message, said message comprising for each coding tool of a plurality of coding tools used for encoding the video data, information representative of an energy consumed by a device in charge of decoding and/or displaying the encoded video data induced by said coding tool and information representative of an impact of said coding tool on a quality of the encoded video data after decoding; using the information comprised in the decoded message to select at least one coding tool of the plurality of coding tools to deactivate or modify; and, decoding the encoded video data by using a decoding process wherein the selected coding tools are deactivated or modified.

In an embodiment, each information is provided for at least a sub-part of the encoded video data corresponding to at least one temporal layer and/or at least one picture and/or at least one slice in a picture and/or at least one tile in a picture and/or at least one block of pixels in a picture and/or at least one block of a picture encoded according to a predetermined coding mode.

In an embodiment, the information representative of an energy consumed by a device in charge of decoding and/or displaying the encoded video data induced by said coding tool is representative of an amount of reduction of an energy consumed by the device in charge of decoding and/or displaying the encoded video data when said coding tool is deactivated or modified and the information representative of an impact of said coding tool on a quality of the encoded video data after decoding is an amount of reduction of a quality of the encoded video data after decoding when said coding tool is deactivated or modified.

In an embodiment, for at least one coding tool, the message comprises an information representative of an amount of reduction of an energy consumed by the device in charge of decoding and/or displaying the encoded video data when said coding tool is deactivated and an information representative of an amount of reduction of an energy consumed by the device in charge of decoding and/or displaying the encoded video data when said coding tool is modified, and an information representative of an amount of reduction of a quality of the encoded video data after decoding when said coding tool is deactivated and an information representative of an amount of reduction of a quality of the encoded video data after decoding when said coding tool is modified.

In an embodiment, for at least one coding tool, the message comprises an information representative of an amount of reduction of an energy consumed by the device in charge of decoding the encoded video data when said coding tool is deactivated and an information representative of an amount of reduction of an energy consumed by the device in charge of decoding the encoded video data when said coding tool is modified and, an information representative of an amount of reduction of an energy consumed by the device in charge of displaying the encoded video data when said coding tool is deactivated and an information representative of an amount of reduction of an energy consumed by the device in charge of displaying the encoded video data when said coding tool is modified.

In an embodiment, the plurality of coding tools comprises a deblocking filter, a SAO, coding tools of the family of using weightings of at least one predictor and inverse mapping.

In a third aspect, one or more of the present embodiments provide a method comprising: encoding video data; generating a message comprising for each coding tool of a plurality of coding tools used for encoding the video data, information representative of an energy consumed by a device in charge of decoding and/or displaying the encoded video data induced by said coding tool and information representative of an impact of said coding tool on a quality of the encoded video data after decoding; and, inserting the generated message into at least one bitstream comprising the encoded video data.

In an embodiment, each information is provided for at least a sub-part of the encoded video data corresponding to at least one temporal layer and/or at least one picture and/or at least one slice in a picture and/or at least one tile in a picture and/or at least one block of pixels in a picture and/or at least one block of a picture encoded according to a predetermined coding mode.

In an embodiment, the information representative of an energy consumed by a device in charge of decoding and/or displaying the encoded video data induced by said coding tool is representative of an amount of reduction of an energy consumed by the device in charge of decoding and/or displaying the encoded video data when said coding tool is deactivated or modified and the information representative of an impact of said coding tool on a quality of the encoded video data after decoding is an amount of reduction of a quality of the encoded video data after decoding when said coding tool is deactivated or modified.

In an embodiment, for at least one coding tool, the message comprises an information representative of an amount of reduction of an energy consumed by the device in charge of decoding and/or displaying the encoded video data when said coding tool is deactivated and an information representative of an amount of reduction of an energy consumed by the device in charge of decoding and/or displaying the encoded video data when said coding tool is modified, and an information representative of an amount of reduction of a quality of the encoded video data after decoding when said coding tool is deactivated and an information representative of an amount of reduction of a quality of the encoded video data after decoding when said coding tool is modified.

In an embodiment, for at least one coding tool, the message comprises an information representative of an amount of reduction of an energy consumed by the device in charge of decoding the encoded video data when said coding tool is deactivated and an information representative of an amount of reduction of an energy consumed by the device in charge of decoding the encoded video data when said coding tool is modified and, an information representative of an amount of reduction of an energy consumed by the device in charge of displaying the encoded video data when said coding tool is deactivated and an information representative of an amount of reduction of an energy consumed by the device in charge of displaying the encoded video data when said coding tool is modified.

In an embodiment, the plurality of coding tools comprises a deblocking filter, a SAO, coding tools of the family of using weightings of at least one predictor and inverse mapping.

In a fourth aspect, one or more of the present embodiments provide a device comprising electronic circuitry adapted for: encoding video data; generating a message comprising for each coding tool of a plurality of coding tools used for encoding the video data, information representative of an energy consumed by a device in charge of decoding and/or displaying the encoded video data induced by said coding tool and information representative of an impact of said coding tool on a quality of the encoded video data after decoding; and, inserting the generated message into at least one bitstream comprising the encoded video data.

In an embodiment, each information is provided for at least a sub-part of the encoded video data corresponding to at least one temporal layer and/or at least one picture and/or at least one slice in a picture and/or at least one tile in a picture and/or at least one block of pixels in a picture and/or at least one block of a picture encoded according to a predetermined coding mode.

In an embodiment, the information representative of an energy consumed by a device in charge of decoding and/or displaying the encoded video data induced by said coding tool is representative of an amount of reduction of an energy consumed by the device in charge of decoding and/or displaying the encoded video data when said coding tool is deactivated or modified and the information representative of an impact of said coding tool on a quality of the encoded video data after decoding is an amount of reduction of a quality of the encoded video data after decoding when said coding tool is deactivated or modified.

In an embodiment, for at least one coding tool, the message comprises an information representative of an amount of reduction of an energy consumed by the device in charge of decoding and/or displaying the encoded video data when said coding tool is deactivated and an information representative of an amount of reduction of an energy consumed by the device in charge of decoding and/or displaying the encoded video data when said coding tool is modified, and an information representative of an amount of reduction of a quality of the encoded video data after decoding when said coding tool is deactivated and an information representative of an amount of reduction of a quality of the encoded video data after decoding when said coding tool is modified.

In an embodiment, for at least one coding tool, the message comprises an information representative of an amount of reduction of an energy consumed by the device in charge of decoding the encoded video data when said coding tool is deactivated and an information representative of an amount of reduction of an energy consumed by the device in charge of decoding the encoded video data when said coding tool is modified and, an information representative of an amount of reduction of an energy consumed by the device in charge of displaying the encoded video data when said coding tool is deactivated and an information representative of an amount of reduction of an energy consumed by the device in charge of displaying the encoded video data when said coding tool is modified.

In an embodiment, the plurality of coding tools comprises a deblocking filter, a SAO, coding tools of the family of using weightings of at least one predictor and inverse mapping.

In a fifth aspect, one or more of the present embodiments provide an apparatus comprising a device according to the second or the fourth aspect.

In a sixth aspect, one or more of the present embodiments provide a signal comprising data generated according to the method according to the third aspect or by the device according to the fourth aspect.

In a seventh aspect, one or more of the present embodiments provide a computer program comprising program code instructions for implementing the decoding method according to first aspect or for implementing the encoding method third aspect.

In a eighth aspect, one or more of the present embodiments provide an information storage means storing program code instructions for implementing the decoding method according to first aspect or for implementing the encoding method third aspect.

4. BRIEF SUMMARY OF THE DRAWINGS

5. DETAILED DESCRIPTION

The following examples of embodiments are described in the context of a video streaming application executed in a video streaming system. In this system, the streamed video is in a format similar to the format specified by the emerging international standard entitled Versatile Video Coding (VVC) under development by a joint collaborative team of ITU-T and ISO/IEC experts known as the Joint Video Experts Team (JVET). However, these embodiments are not limited to the video coding/decoding method corresponding to VVC and applies to other video coding/decoding methods, such as for example the standard HEVC (ISO/IEC 23008-2-MPEG-H Part 2, High Efficiency Video Coding/ITU-T H.265, AVC (Advanced Video Coding (ITU-T H.264/ISO/IEC MPEG-4 Part 10 (ISO/IEC 14496-10)), EVC (Essential Video Coding/MPEG-5) or AV1.

Figure 1:
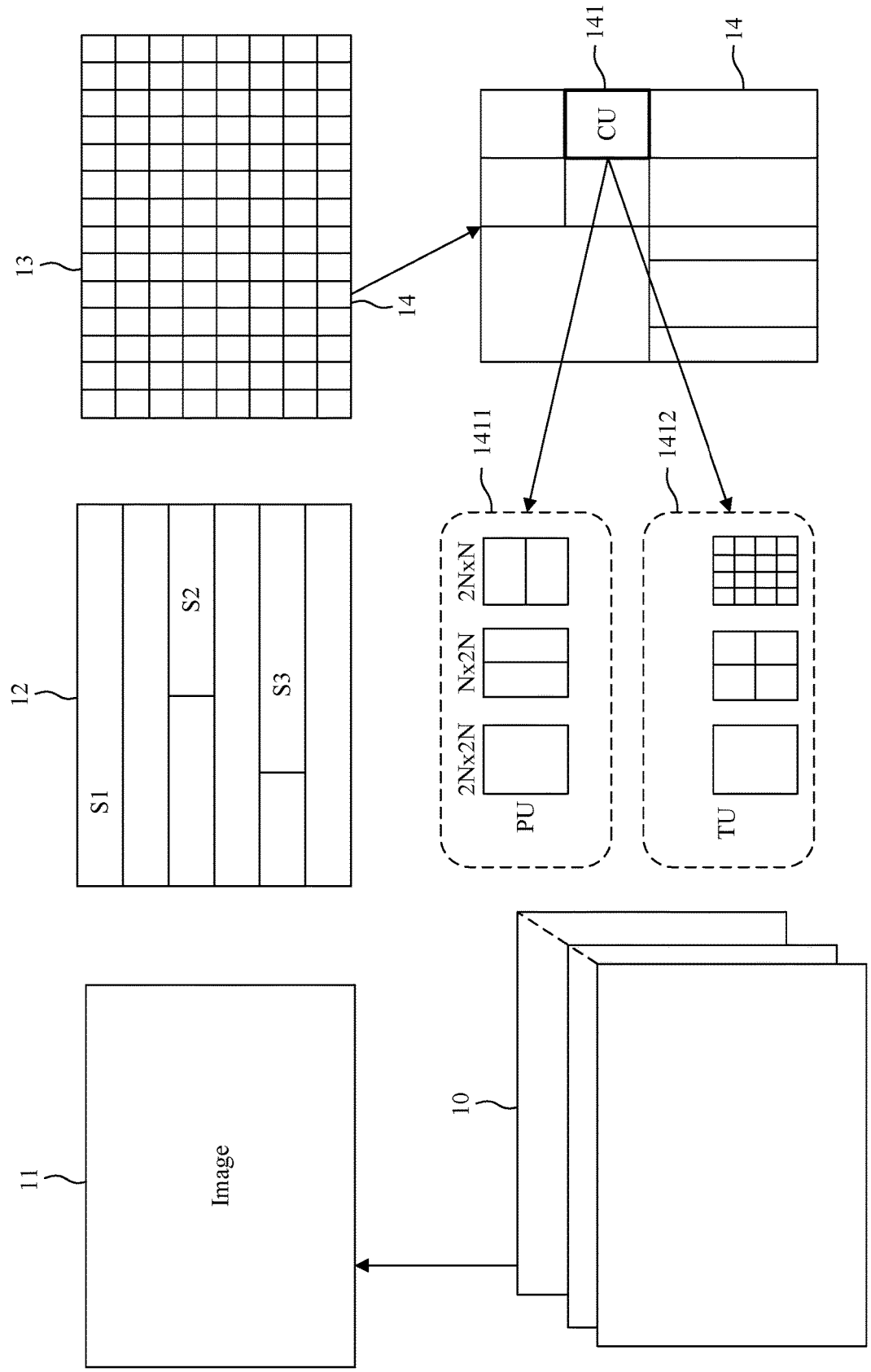
FIG. 1 illustrates an example of partitioning undergone by an image of pixels of an original video.
Figure 2:
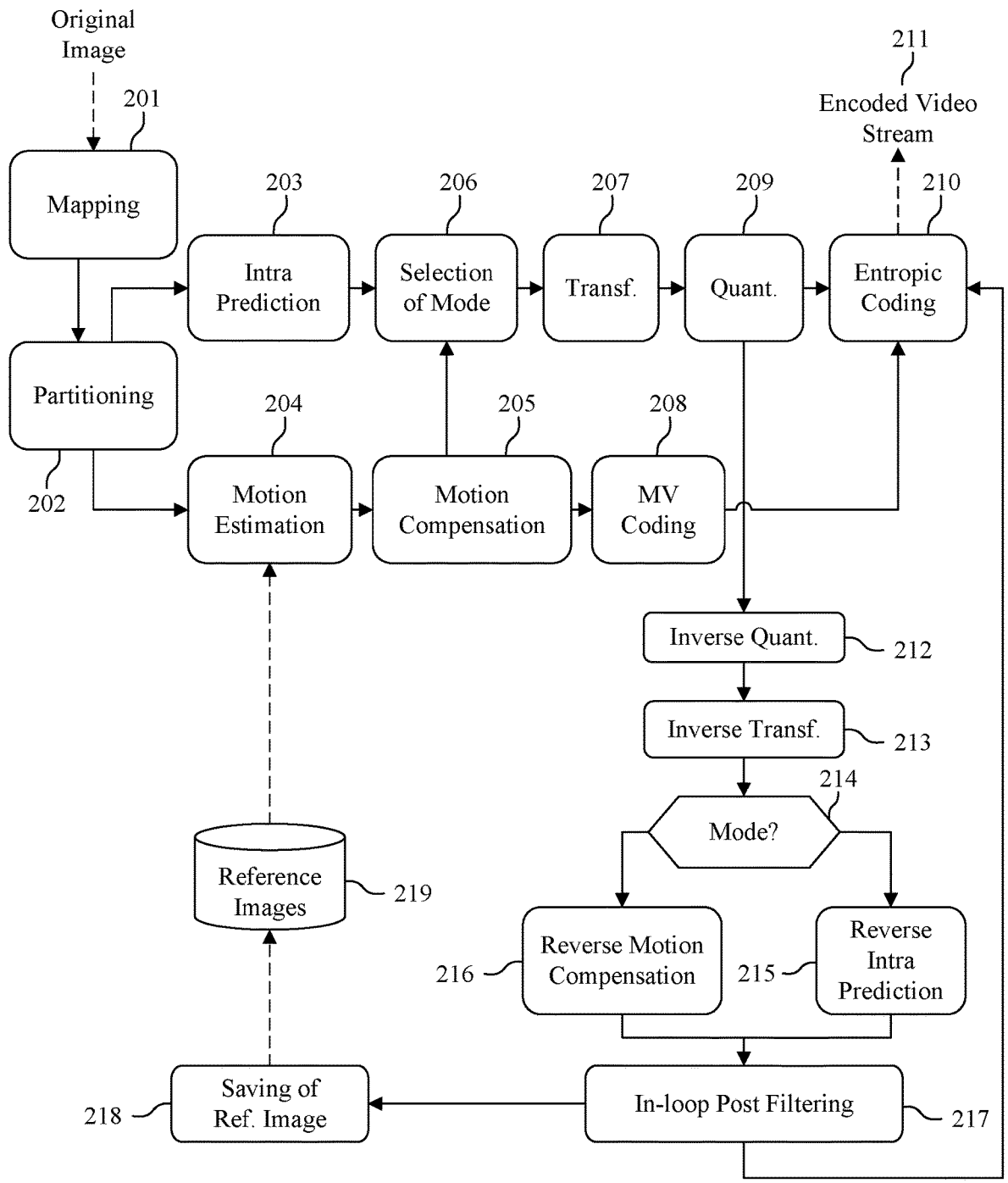
FIG. 2 depicts schematically a method for encoding a video stream.
Figure 3:
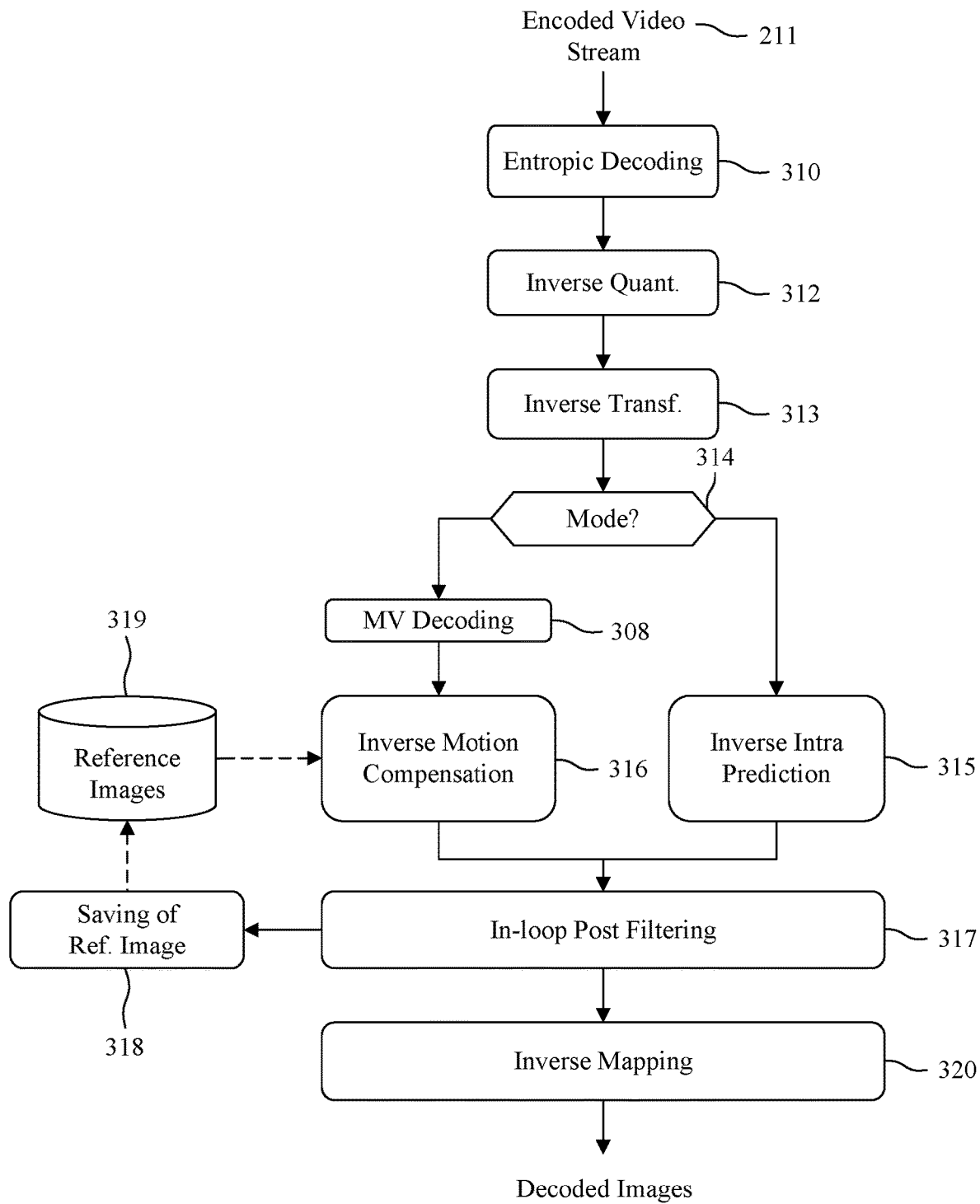
FIG. 3 depicts schematically a method for decoding an encoded video stream.

FIGS. 1, 2 and 3 introduce the format of the streamed video.

FIG. 1 illustrates an example of partitioning undergone by an image of pixels 11 of an original video 10. It is considered here that a pixel is composed of three components: a luminance component and two chrominance components.

An image is divided into a plurality of coding entities. First, as represented by reference 13 in FIG. 1, an image is divided in a grid of blocks called coding tree units (CTU). A CTU consists of an N×N block of luminance samples together with two corresponding blocks of chrominance samples. N is generally a power of two having a maximum value of "128" for example. Second, an image is divided into one or more group of CTU. For example, it can be divided into one or more tile rows and tile columns, a tile being a sequence of CTU covering a rectangular region of an image. In some cases, a tile could be divided into one or more bricks, each of which consisting of at least one row of CTU within the tile. Above the concept of tiles and bricks, another encoding entity, called slice, exists, that can contain at least one tile of an image or at least one brick of a tile.

In the example in FIG. 1, as represented by reference 12, the image 11 is divided into three slices S1, S2 and S3 of the raster-scan slice mode, each comprising a plurality of tiles (not represented), each tile comprising only one brick.

As represented by reference 14 in FIG. 1, a CTU may be partitioned into the form of a hierarchical tree of one or more sub-blocks called coding units (CU). The CTU is the root (i.e. the parent node) of the hierarchical tree and can be partitioned in a plurality of CU (i.e. child nodes). Each CU becomes a leaf of the hierarchical tree if it is not further partitioned in smaller CU or becomes a parent node of smaller CU (i.e. child nodes) if it is further partitioned.

In the example of FIG. 1, the CTU 14 is first partitioned in "4" square CU using a quadtree type partitioning. The upper left CU is a leaf of the hierarchical tree since it is not further partitioned, i.e. it is not a parent node of any other CU. The upper right CU is further partitioned in "4" smaller square CU using again a quadtree type partitioning. The bottom right CU is vertically partitioned in "2" rectangular CU using a binary tree type partitioning. The bottom left CU is vertically partitioned in "3" rectangular CU using a ternary tree type partitioning.

During the coding of an image, the partitioning is adaptive, each CTU being partitioned so as to optimize a compression efficiency of the CTU criterion.

In HEVC appeared the concept of prediction unit (PU) and transform unit (TU). Indeed, in HEVC, the coding entity that is used for prediction (i.e. a PU) and transform (i.e. a TU) can be a subdivision of a CU. For example, as represented in FIG. 1, a CU of size 2N×2N, can be divided in PU 1411 of size N×2N or of size 2N×N. In addition, said CU can be divided in "4" TU 1412 of size N×N or in "16" TU of size $$\left(\frac{N}{2}\right) \times \left(\frac{N}{2}\right).$$

One can note that in VVC, except in some particular cases, frontiers of the TU and PU are aligned on the frontiers of the CU. Consequently, a CU comprises generally one TU and one PU.

In the present application, the term "block" or "image block" can be used to refer to any one of a CTU, a CU, a PU and a TU. In addition, the term "block" or "image block" can be used to refer to a macroblock, a partition and a sub-block as specified in H.264/AVC or in other video coding standards, and more generally to refer to an array of samples of numerous sizes.

In the present application, the terms "reconstructed" and "decoded" may be used interchangeably, the terms "pixel" and "sample" may be used interchangeably, the terms "image," "picture", "sub-picture", "slice" and "frame" may be used interchangeably. Usually, but not necessarily, the term "reconstructed" is used at the encoder side while "decoded" is used at the decoder side.

FIG. 2 depicts schematically a method for encoding a video stream executed by an encoding module. Variations of this method for encoding are contemplated, but the method for encoding of FIG. 2 is described below for purposes of clarity without describing all expected variations.

Before being encoded, a current original image of an original video sequence may go through pre-encoding processing. For example, in a step 201, a color transform is applied to the current original image (e.g., conversion from RGB 4:4:4 to YCbCr 4:2:0), or a remapping is applied to the current original image components in order to get a signal distribution more resilient to compression (for instance using a histogram equalization of one of the color components). The obtained image is called mapped image in the following.

The encoding of the mapped image begins with a partitioning of the mapped image during a step 202, as described in relation to FIG. 1. The mapped image is thus partitioned into CTU, CU, PU, TU, etc. For each block, the encoding module determines a coding mode between an intra prediction and an inter prediction.

The intra prediction consists of predicting, in accordance with an intra prediction method, during a step 203, the pixels of a current block from a prediction block derived from pixels of reconstructed blocks situated in a causal vicinity of the current block to be coded. The result of the intra prediction is a prediction direction indicating which pixels of the blocks in the vicinity to use, and a residual block resulting from a calculation of a difference between the current block and the prediction block.

The inter prediction consists of predicting the pixels of a current block from a block of pixels, referred to as the reference block, of an image preceding or following the current image, this image being referred to as the reference image. During the coding of a current block in accordance with the inter prediction method, a block of the reference image closest, in accordance with a similarity criterion, to the current block is determined by a motion estimation step 204. During step 204, a motion vector indicating the position of the reference block in the reference image is determined. Said motion vector is used during a motion compensation step 205 during which a residual block is calculated in the form of a difference between the current block and the reference block.

In the first video compression standards, the mono-directional inter prediction mode described above was the only inter mode available. As video compression standards evolve, the family of inter modes has grown significantly and comprises now many different inter modes.

A first evolution of the inter mode was the bi-prediction (or B mode). In the B mode a current block is associated with two motion vectors, designating two reference blocks in two different images. A predictor block biPred allowing to compute the residual block for the current block is an average of two reference blocks. Said predictor biPred for the current block is computed as follows:

$$\text{biPred} = (w_0 \cdot \text{pred}_1 + w_1 \cdot \text{pred}_1 + 1)/2$$

where $\text{pred}_0$ is a motion compensated block predictor taken in a list L0 of reference images stored in a buffer of decoded images, called generally Decoded Picture Buffer (DPB); $\text{pred}_1$ is a motion compensated block predictor taken in a list L1 of reference images stored in the DPB; $w_0$ and $w_1$ are weights equal to one in the case of bi-prediction.

Several generalizations of bi-prediction were proposed in which the weights $w_0$ and $w_1$ can be different. weighted prediction (WP) could be considered as a generalization of bi-directional inter predictions on some aspects. In WP, the residual block is computed as a difference between the current block and either a weighted version of a reference block in case of mono-directional inter prediction or a weighted average of two reference blocks in case of bi-prediction. WP defines weights $w_i$ and offsets $\text{off}_i$ per group of CTU (e.g. generally at a slice header level) associated to each component of each reference picture i of each list (L0 and L1) of reference images stored in the DPB. If a current block is coded in mono-prediction WP, a prediction sample pred(x,y) at position (x,y) for said current block is computed as follows:

$$\text{pred}(x,y)=((w_0 \cdot \text{pred}_0(x,y)+(1<<(\text{shift}-1)))>>\text{shift})+\text{Off}_0$$

where $\text{pred}_0(x, y)$ is a motion compensated predictor sample taken in the list L0 of reference images stored in the DPB and spatially corresponding to pred(x, y), $w_0$ is a weight, $\text{Off}_0$ is an offset value, shift is a shift value, (y<<x) is a left shift of x bits of the binary representation of y and (y>>x) is a right shift of x bits of the binary representation of y.

If a current block is coded in bi-prediction WP, the prediction sample pred(x,y) at position (x,y) for said current block is computed as follows:

$$\text{pred}(x,y)=((w_0 \cdot \text{pred}_0(x,y)+w_1 \cdot \text{pred}_1(x,y)+\text{Off}_{01})>>(\text{shift}+1))$$

with $\text{Off}_{01}=(\text{Off}_0+\text{Off}_1+1)>>\text{shift}$ where $\text{pred}_1(x, y)$ is a motion compensated predictor sample taken in the list L1 of reference images stored in the DPB and spatially corresponding to pred(x, y), $w_1$ is a weight, $\text{Off}_1$ is an offset value.

While WP is enabled in a sequence header (SPS) and in an image header (PPS) and the associated weights and offsets are specified in a slice header, a new mode called Bi-prediction with CU-level weight (BCW), allows signalling weights at the block level. When the BCW mode is applied to a current block, a predictor sample pred(x, y) for said current block is computed as follows:

$$\text{pred}(x,y)=((8-w) \cdot \text{pred}_0(x,y)+w \cdot \text{pred}_1(x,y)+4)>>3$$

where $\text{pred}_0(x, y)$ is a motion compensated predictor sample taken in the list L0 of reference images stored in the DPB and spatially corresponding to pred(x, y), $\text{pred}_1(x, y)$ is a motion compensated predictor sample taken in the list L1 of reference images stored in the DPB and spatially corresponding to pred(x, y), and w is a weight taken in a set of five weights ($w \in \{-2, 3, 4, 5, 10\}$). The weight w is determined in one of two ways: 1) for a non-merge CU, a weight index bcw_idx is signalled after the motion vector difference; 2) for a merge CU, the weight index bcw_idx is inferred from neighbouring blocks based on the merge candidate index.

During the standardization process of VVC, a new inter mode, called Local Illumination compensation (LIC), intended to compensate for illumination change which may occur between a current block and its reference block in inter prediction was proposed. When this tool is activated for a current block, some prediction parameters are computed based on some reconstructed image samples, localized on the left and/or on the top of the current block and reference image samples localized on the left and/or on the top of a reference block identified by a motion vector. A LIC model based on the computed prediction parameters is then applied to the prediction samples of the reference block. A prediction sample $\text{Pred}_{corr}(x, y)$ corrected using LIC is computed as follows:

$$\text{Pred}_{corr}(x,y)=((a \cdot \text{Pred}(x,y)+(1<<(\text{shift}-1)))>>\text{shift})+b$$

where $\text{Pred}_{corr}(x, y)$ is a sample at position (x,y) corrected by LIC, Pred(x, y) is a motion compensated prediction sample value at position (x,y), shift is a value of a binary shift as already evocated above in relation to WP, a and b are LIC parameters.

In VVC, a new tool called Combined Intra and Inter Prediction (CIIP) was also proposed. As its name indicates, the CIIP mode combines an inter prediction signal with an intra prediction signal. The inter prediction signal in the CIIP mode is derived using the same inter prediction process applied to the regular merge mode (i.e. derivation of motion information of a current block from a neighbouring block). The intra prediction signal is derived following the regular intra prediction process with the planar mode. Then, the intra and inter prediction signals are combined using weighted averaging, where the weight values are calculated depending on the coding modes of the top and left neighbouring blocks. More precisely, a CIIP predictor is obtained with the following formulae:

$$P_{CIIP}(w_A \cdot P_{inter}+w_B \cdot P_{intra}+\text{off})>>\text{shift}$$

Where $P_{inter}$ is the inter predictor, $P_{intra}$ is the intra predictor, off and shift are respectively a constant offset and a constant shift equal to two, and $w_A$ and $w_B$ are weights depending on the coding modes of the top and left neighbouring blocks.

During a selection step 206, the prediction mode optimising the compression performances, in accordance with a rate/distortion optimization criterion (i.e. RDO criterion), among the prediction modes tested (Intra prediction modes, Inter prediction modes), is selected by the encoding module.

When the prediction mode is selected, the residual block is transformed during a step 207 and quantized during a step 209. Note that the encoding module can skip the transform and apply quantization directly to the non-transformed residual signal. When the current block is coded according to an intra prediction mode, a prediction direction and the transformed and quantized residual block are encoded by an entropic encoder during a step 210. When the current block is encoded according to an inter prediction, when appropriate, a motion vector of the block is predicted from a prediction vector selected from a set of motion vectors corresponding to reconstructed blocks situated in the vicinity of the block to be coded. The motion information is next encoded by the entropic encoder during step 210 in the form of a motion residual and an index for identifying the prediction vector. The transformed and quantized residual block is encoded by the entropic encoder during step 210. Note that the encoding module can bypass both transform and quantization, i.e., the entropic encoding is applied on the residual without the application of the transform or quantization processes. The result of the entropic encoding is inserted in an encoded video stream 211. Metadata such as SEI (supplemental enhancement information) messages can be attached to the encoded video stream 211. A SEI (Supplemental Enhancement Information) message as defined for example in standards such as AVC, HEVC or VVC is a data container associated to a video stream and comprising metadata providing information relative to the video stream.

After the quantization step 209, the current block is reconstructed so that the pixels corresponding to that block can be used for future predictions. This reconstruction phase is also referred to as a prediction loop. An inverse quantization is therefore applied to the transformed and quantized residual block during a step 212 and an inverse transformation is applied during a step 213. According to the prediction mode used for the block obtained during a step 214, the prediction block of the block is reconstructed. If the current block is encoded according to an inter prediction mode, the encoding module applies, when appropriate, during a step 216, a motion compensation using the motion vector of the current block in order to identify the reference block of the current block. If the current block is encoded according to an intra prediction mode, during a step 215, the prediction direction corresponding to the current block is used for reconstructing the reference block of the current block. The reference block and the reconstructed residual block are added in order to obtain the reconstructed current block.

Following the reconstruction, an in-loop post-filtering intended to reduce the encoding artefacts is applied, during a step 217, to the reconstructed block. This post-filtering is called in-loop post-filtering since this post-filtering occurs in the prediction loop to obtain at the decoder the same reference images as the encoder and thus avoid a drift between the encoding and the decoding processes. For instance, in HEVC, the in-loop post-filtering comprises a deblocking filtering and a SAO (sample adaptive offset) filtering.

The purpose of deblocking filtering is to attenuate discontinuities at block boundaries due to the differences in quantisation between blocks. It is an adaptive filtering that can be activated or deactivated and, when it is activated, that can take the form of a high-complexity deblocking filtering based on a separable filter with a dimension comprising six filter coefficients, which is referred to hereinafter as strong deblocking filter (SDBF), and a low-complexity deblocking filtering based on a separable filter with one dimension comprising four coefficients, which is referred to hereinafter as weak deblocking filter (WDBF). The SDBF greatly attenuates discontinuities at the block boundaries, which may damage spatial high frequencies present in original images. The WDBF weakly attenuates discontinuities at the block boundaries, which makes it possible to preserve high spatial frequencies present in the original images but which will be less effective on discontinuities artificially created by the quantisation. The decision to filter or not to filter, and the form of the filter used in the event of filtering, depend among other things on the value of the pixels at the boundaries of the block to be filtered.

SAO filtering takes two forms having two different objectives. The purpose of the first form, referred to as edge offset, is to compensate for the effects of the quantisation on the edges in the blocks. SAO filtering by edge offset comprises a classification of the pixels of the reconstructed image in accordance with four categories corresponding to four respective types of edge. The classification of a pixel is done by filtering according to four filters, each filter making it possible to obtain the filtering gradient. The filtering gradient maximising a classification criterion indicates the type of edge corresponding to the pixel. Each type of edge is associated with an offset value that is added to the pixels during the SAO filtering.

The second form of SAO is referred to as band offset and its purpose is to compensate for the effect of the quantisation of the pixels belonging to certain ranges (i.e. bands) of values. In band-offset filtering, all the possible values for a pixel, most frequently lying between 0 and 255 for 8-bit video streams, is divided into thirty-two bands of eight values. Among these thirty-two bands, four consecutive bands are selected to be offset. When a pixel has a value lying in one of the four bands of values to be offset, an offset value is added to the value of the pixel.

The decision to use SAO filtering and, when SAO filtering is used, the form of the SAO filtering and the offset values are determined for each CTU by during the encoding process by means of a rate/distortion optimisation.

Parameters representative of the activation or the deactivation of the in-loop filters and when activated, of characteristics of said in-loop filters are introduced in the encoded video stream 211 during the entropic coding step 210.

When a block is reconstructed, it is inserted during a step 218 into a reconstructed image stored in a memory 219 of reconstructed images string the DPB. The reconstructed images thus stored can then serve as reference images for other images to be coded.

FIG. 3 depicts schematically a method for decoding the encoded video stream 211 encoded according to method described in relation to FIG. 2 executed by a decoding module. Variations of this method for decoding are contemplated, but the method for decoding of FIG. 3 is described below for purposes of clarity without describing all expected variations.

The decoding is done block by block. For a current block, it starts with an entropic decoding of the current block during a step 310. Entropic decoding allows to obtain the prediction mode of the block.

If the block has been encoded according to an inter prediction mode, the entropic decoding allows to obtain, when appropriate, a prediction vector index, a motion residual and a residual block. During a step 308, a motion vector is reconstructed for the current block using the prediction vector index and the motion residual.

If the block has been encoded according to an intra prediction mode, entropic decoding allows to obtain a prediction direction and a residual block. Steps 312, 313, 314, 315, 316 and 317 implemented by the decoding module are in all respects identical respectively to steps 212, 213, 214, 215, 216 and 217 implemented by the encoding module. Decoded blocks are saved in decoded images and the decoded images are stored in a reference image memory 319 storing the DPB in a step 318. When the decoding module decodes a given image, the images stored in the reference image memory 319 are identical to the images stored in the reference image memory 219 by the encoding module during the encoding of said given image. The decoded image can also be outputted by the decoding module for instance to be displayed.

The decoded image can further go through post-decoding processing in step 320, for example, an inverse color transform (e.g. conversion from YCbCr 4:2:0 to RGB 4:4:4) or an inverse mapping performing the inverse of the remapping process performed in the pre-encoding processing of step 201.

As can be seen from the above, the selection of an coding tool (a partitioning, a prediction mode, an in-loop filter, . . . ) for a block is generally based on a RDO criterion. This selection criterion rarely considers the impact of selecting a prediction mode on the decoding complexity and a fortiori, on the energy consumption induced by this tool. Thus, as soon as an activation of an coding tool is better according to the RDO criterion, this tool is selected, whether the energy consumption induced by this tool is high or not and whether the gain in terms of RDO is high or not.

One solution could be to replace the RDO criterion by a criterion allowing finding an optimal trade-off between the rate, the distortion and the energy cost of each tool at the encoding process level. However, this solution supposes knowing the constraints of each device or system to which the encoded video stream is intended in terms of energy consumption. The following embodiments propose a solution executed exclusively by the device or system in charge of decoding the video stream. This solution doesn't prevent the encoder to continue generating the best video stream in terms of RDO criterion without taking into account any complexity or energy cost information, i.e. without taking into account any energy consumption requirement from the device or system in charge of decoding the video stream.

Figure 4A:
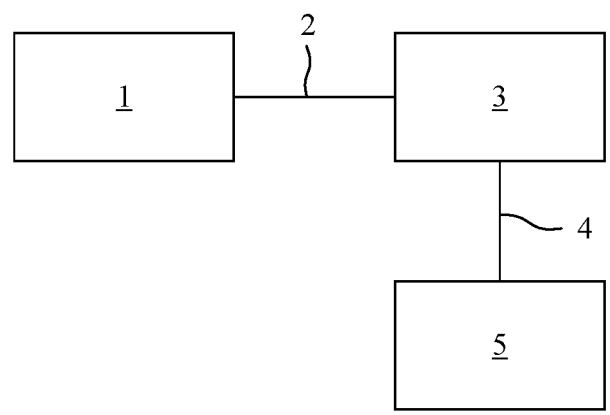
FIG. 4A illustrates schematically an example of video streaming system in which embodiments are implemented.

FIG. 4A describes an example of video streaming system in which following embodiments can be implemented.

In FIG. 4A, an apparatus 1, that could be a camera, a storage device, a computer, a server or any device capable of delivering a video stream, transmits a video stream to a system 3 using a communication channel 2. The video stream is either encoded and transmitted by the apparatus 1 or received and/or stored by the apparatus 1 and then transmitted. The communication channel 2 is a wired (for example Internet or Ethernet) or a wireless (for example WiFi, 3G, 4G or 5G) network link.

The system 3, that could be for example a set top box, receives and decodes the video stream to generate a sequence of decoded images.

The obtained sequence of decoded images is then transmitted to a display system 5 using a communication channel 4, that could be a wired or wireless network. The display system 5 then displays said images.

In an embodiment, the system 3 is comprised in the display system 5. In that case, the system 3 and display 5 a comprised in a TV, a computer, a tablet, a smartphone, etc.

Figure 4B:
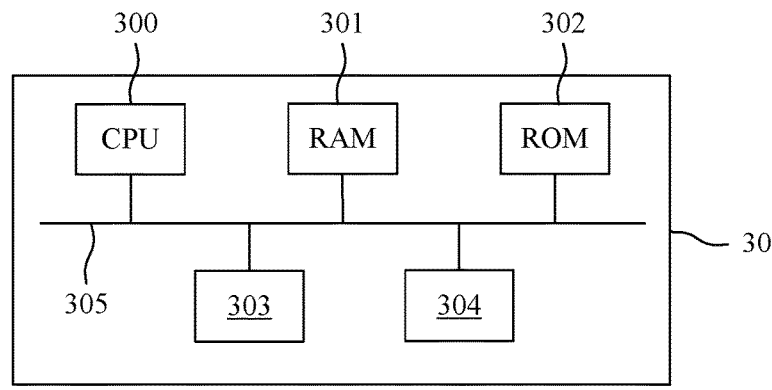
FIG. 4B illustrates schematically an example of hardware architecture of a processing module able to implement an encoding module or a decoding module in which various aspects and embodiments are implemented.

FIG. 4B illustrates schematically an example of hardware architecture of a processing module 30 able to implement an encoding module or a decoding module capable of implementing respectively a method for encoding of FIG. 2 and a method for decoding of FIG. 3 modified according to different aspects and embodiments. The encoding module is for example comprised in the apparatus 1 when this apparatus is in charge of encoding the video stream. The decoding module is for example comprised in the system 3. The processing module 30 comprises, connected by a communication bus 305: a processor or CPU (central processing unit) 300 encompassing one or more microprocessors, general purpose computers, special purpose computers, and processors based on a multi-core architecture, as non-limiting examples; a random access memory (RAM) 301; a read only memory (ROM) 302; a storage unit 303, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive, or a storage medium reader, such as a SD (secure digital) card reader and/or a hard disc drive (HDD) and/or a network accessible storage device; at least one communication interface 304 for exchanging data with other modules, devices or equipment. The communication interface 304 can include, but is not limited to, a transceiver configured to transmit and to receive data over communication channel. The communication interface 304 can include, but is not limited to, a modem or network card.

If the processing module 30 implements a decoding module, the communication interface 304 enables for instance the processing module 30 to receive encoded video streams and to provide a sequence of decoded images. If the processing module 30 implements an encoding module, the communication interface 304 enables for instance the processing module 30 to receive a sequence of original image data to encode and to provide an encoded video stream.

The processor 300 is capable of executing instructions loaded into the RAM 301 from the ROM 302, from an external memory (not shown), from a storage medium, or from a communication network. When the processing module 30 is powered up, the processor 300 is capable of reading instructions from the RAM 301 and executing them. These instructions form a computer program causing, for example, the implementation by the processor 300 of a decoding method as described in relation with FIG. 3 or an encoding method described in relation to FIG. 2, the decoding and encoding methods comprising various aspects and embodiments described below in this document.

All or some of the algorithms and steps of said encoding or decoding methods may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit).

Figure 4C:
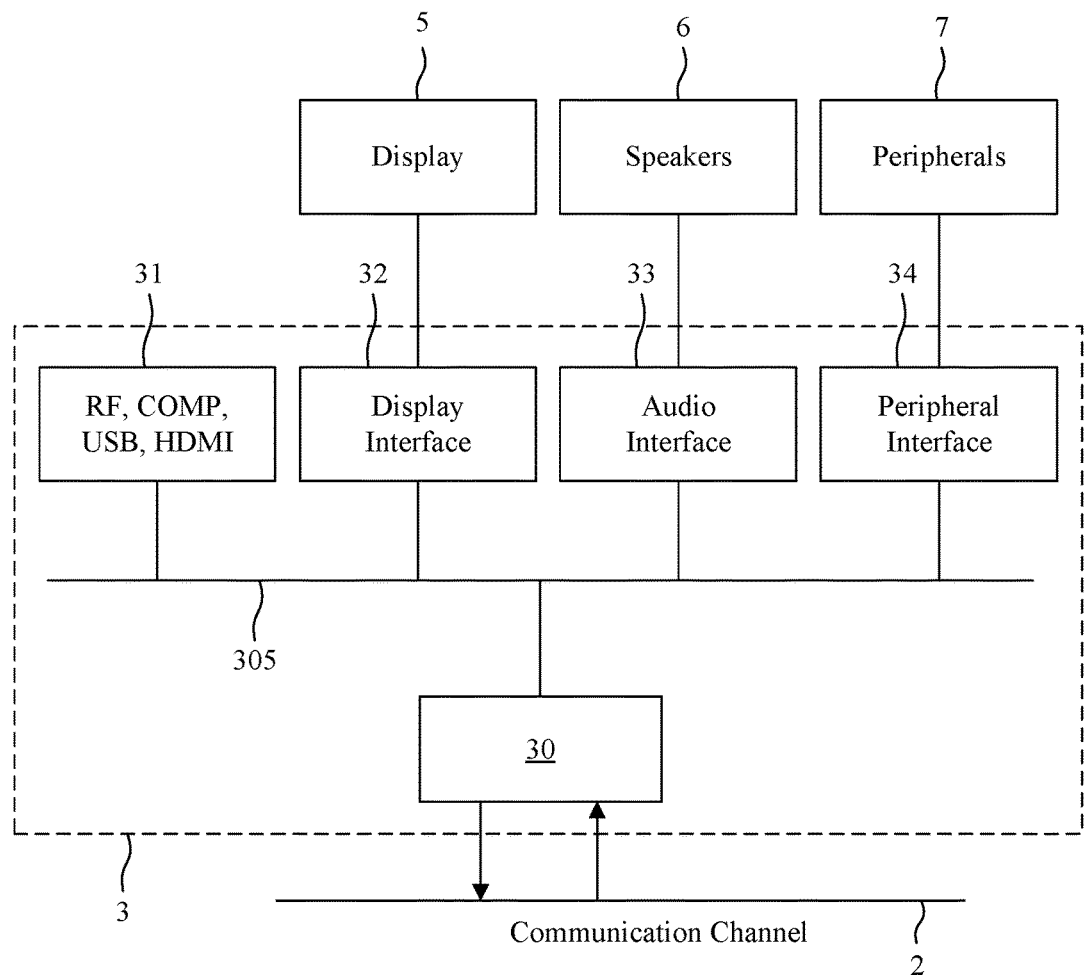
FIG. 4C illustrates a block diagram of an example of a system in which various aspects and embodiments are implemented.

FIG. 4C illustrates a block diagram of an example of the system 3 in which various aspects and embodiments are implemented. The system 3 can be embodied as a device including the various components described below and is configured to perform one or more of the aspects and embodiments described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 3, singly or in combination, can be embodied in a single integrated circuit (IC), multiple ICs, and/or discrete components. For example, in at least one embodiment, the system 3 comprises one processing module 30 that implements a decoding module. In various embodiments, the system 30 is communicatively coupled to one or more other systems, or other electronic devices, via, for example, a communications bus or through dedicated input and/or output ports. In various embodiments, the system 3 is configured to implement one or more of the aspects described in this document.

The input to the processing module 30 can be provided through various input modules as indicated in block 31. Such input modules include, but are not limited to, (i) a radio frequency (RF) module that receives an RF signal transmitted, for example, over the air by a broadcaster, (ii) a component (COMP) input module (or a set of COMP input modules), (iii) a Universal Serial Bus (USB) input module, and/or (iv) a High Definition Multimedia Interface (HDMI) input module. Other examples, not shown in FIG. 4C, include composite video.

In various embodiments, the input modules of block 31 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF module and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Additionally, the USB and/or HDMI modules can include respective interface processors for connecting system 3 to other electronic devices across USB and/or HDMI connections. It is to be understood that various aspects of input processing, for example, Reed-Solomon error correction, can be implemented, for example, within a separate input processing IC or within the processing module 30 as necessary. Similarly, aspects of USB or HDMI interface processing can be implemented within separate interface ICs or within the processing module 30 as necessary. The demodulated, error corrected, and demultiplexed stream is provided to the processing module 30.

Various elements of system 3 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system 3, the processing module 30 is interconnected to other elements of said system 3 by the bus 305.

The communication interface 304 of the processing module 30 allows the system 3 to communicate on the communication channel 2. As already mentioned above, the communication channel 2 can be implemented, for example, within a wired and/or a wireless medium.

Data is streamed, or otherwise provided, to the system 3, in various embodiments, using a wireless network such as a Wi-Fi network, for example IEEE 802.11 (IEEE refers to the Institute of Electrical and Electronics Engineers). The Wi-Fi signal of these embodiments is received over the communications channel 2 and the communications interface 304 which are adapted for Wi-Fi communications. The communications channel 2 of these embodiments is typically connected to an access point or router that provides access to external networks including the Internet for allowing streaming applications and other over-the-top communications. Other embodiments provide streamed data to the system 3 using the RF connection of the input block 31. As indicated above, various embodiments provide data in a non-streaming manner. Additionally, various embodiments use wireless networks other than Wi-Fi, for example a cellular network or a Bluetooth network.

The system 3 can provide an output signal to various output devices, including a display system 5, speakers 6, and other peripheral devices 7. The display system 5 of various embodiments includes one or more of, for example, a touchscreen display, an organic light-emitting diode (OLED) display, a curved display, and/or a foldable display. The display 5 can be for a television, a tablet, a laptop, a cell phone (mobile phone), or other devices. The display system 5 can also be integrated with other components (for example, as in a smart phone), or separate (for example, an external monitor for a laptop). The other peripheral devices 7 include, in various examples of embodiments, one or more of a stand-alone digital video disc (or digital versatile disc) (DVR, for both terms), a disk player, a stereo system, and/or a lighting system. Various embodiments use one or more peripheral devices 7 that provide a function based on the output of the system 3. For example, a disk player performs the function of playing an output of the system 3.

In various embodiments, control signals are communicated between the system 3 and the display system 5, speakers 6, or other peripheral devices 7 using signaling such as AV.Link, Consumer Electronics Control (CEC), or other communications protocols that enable device-to-device control with or without user intervention. The output devices can be communicatively coupled to system 3 via dedicated connections through respective interfaces 32, 33, and 34. Alternatively, the output devices can be connected to system 3 using the communications channel 2 via the communications interface 304 or a dedicated communication channel 4 via the communication interface 304. The display system 5 and speakers 6 can be integrated in a single unit with the other components of system 3 in an electronic device such as, for example, a television. In various embodiments, the display interface 32 includes a display driver, such as, for example, a timing controller (T Con) chip.

The display system 5 and speaker 6 can alternatively be separate from one or more of the other components. In various embodiments in which the display system 5 and speakers 6 are external components, the output signal can be provided via dedicated output connections, including, for example, HDMI ports, USB ports, or COMP outputs.

Various implementations involve decoding. "Decoding", as used in this application, can encompass all or part of the processes performed, for example, on a received encoded video stream in order to produce a final output suitable for display. In various embodiments, such processes include one or more of the processes typically performed by a decoder, for example, entropy decoding, inverse quantization, inverse transformation, and prediction. In various embodiments, such processes also, or alternatively, include processes performed by a decoder of various implementations described in this application, for example, for modifying or deactivating a coding tool.

As further examples, in one embodiment "decoding" refers only to inverse quantization (312) and/or inverse transform (313) and/or in-loop post filtering (step 317) and/or inverse mapping (320). Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded video stream. In various embodiments, such processes include one or more of the processes typically performed by an encoder, for example, partitioning, prediction, transformation, quantization, and entropy encoding. In various embodiments, such processes also, or alternatively, include processes performed by an encoder of various implementations described in this application, for example, for generating a SEI message comprising energy and quality information corresponding to an encoded video stream.

As further examples, in one embodiment "encoding" refers to quantization (209) and/or transform (207) and/or in-loop post filtering (step 217) and/or mapping (201). Whether the phrase "encoding process" is intended to refer specifically to a subset of operations or generally to the broader encoding process will be clear based on the context of the specific descriptions and is believed to be well understood by those skilled in the art.

Note that the syntax elements names as used herein, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between a rate and a distortion is usually considered. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of a reconstructed signal after coding and decoding. Faster approaches may also be used, to save encoding complexity, in particular with computation of an approximated distortion based on a prediction or a prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, retrieving the information from memory or obtaining the information for example from another device, module or from user.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", "one or more of" for example, in the cases of "A/B", "A and/or B" and "at least one of A and B", "one or more of A and B" is intended to encompass the selection of the first listed option (A) only, or the selection of the second listed option (B) only, or the selection of both options (A and B). As a further example, in the cases of "A, B, and/or C" and "at least one of A, B, and C", "one or more of A, B and C" such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a use of some coding tools. In this way, in an embodiment the same parameters can be used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the encoded video stream and SEI messages of a described embodiment. Such a signal can be formatted, for example, as an electromagnetic wave (for example, using a radio frequency portion of spectrum) or as a baseband signal. The formatting can include, for example, encoding an encoded video stream and modulating a carrier with the encoded video stream. The information that the signal carries can be, for example, analog or digital information. The signal can be transmitted over a variety of different wired or wireless links, as is known. The signal can be stored on a processor-readable medium.

The standard ISO/IEC 23001-11 (Energy-Efficient Media Consumption (Green Metadata)) specifies metadata aiming at signaling complexity information or metrics (CMs) for different processes of the video distribution chain (encoding, adaptive streaming, decoding, displaying). Regarding the decoder side, the complexity information is given for different Decoding Modules (DMs): entropy decoding, dequantization and inverse transform, intra prediction, motion compensation, deblocking, and side-information preparation. This information can be used by the decoder to set its CPU frequency at a lower frequency that guarantees decoding completion within frame-rate deadlines and therefore potentially provides power reduction.

The CMs are signaled per period. The period type (indicated as syntax element "period_type") is either a single picture, a group of pictures (GOP), or a time interval.

The CMs are made of the following information:
proportion of blocks of size 8×8, 16×16 and 32×32, respectively, being in non-zero areas. This information impacts the entropy decoding, inverse quantization and inverse transform processes;
proportion of intra blocks, and for those intra blocks, proportion of blocks being coding according to specific intra modes (planar, DC, angular horizontal/vertical). This information impacts the intra blocks decoding process;
for inter blocks, proportion of blocks using motion compensation for different sub-sample positions. This information impacts the motion compensation process;
proportion of blocks using the deblocking filtering.

If this information is already useful to control the decoder complexity, some important aspects are not addressed by this specification:
the metadata give information about the proportion of usage of specific coding tools but there is no information on their impact on the quality of the decoded video;
the concept considered in Green MPEG is only to have indication of complexity of processes mandatorily involved in the decoding process; there is nothing on the ability to de-activate at the decoder side some specific coding tools/processes to save energy, and on the impact of doing such de-activation on the overall decoded video quality.

The following embodiments propose to specify new metadata related to different coding tools or set of coding tools. In the following, since the purpose of these metadata is to guide a modification of the decoding process, these coding tools are called decoding sub-processes (DSPs). For each DSP, metrics indicative of the energy consumption and quality impact of deactivating the DSP are specified as syntax elements in a metadata container such as for instance a SEI message. This container can be conveyed to the decoder either attached to the video streams, or in an independent transport layer. In the following the SEI message will be used, but the concept can be generalized to other types of metadata container.

A granularity of the signaled metrics can be based on:
Time: data are signaled per period/duration of the video content;
Temporal layers: data are signaled per temporal layer (identified for instance in the VVC specification by the parameter "TemporalId");
Slice type: intra and inter slices (identified for instance in the VVC specification by the syntax element "sh_slice_type");
Parts of the picture: Slices, Tiles, Sub-pictures, Coding Tree Units;
Coding Units (CUs) coding modes: data can be signaled per coding mode, at high-level (intra or inter) and at finer level (various intra coding modes, various inter coding modes).
Coding block sizes: for instance, by differentiating coding block of size smaller or equal to "16" samples from the other coding blocks.

The SEI message is generated at the encoder, that performs the estimation of the metrics and signals them in the SEI message. Transcoding processes can also generate or update the SEI message. Alternatively, this can be done outside of the encoder or transcoder, in a post-encoder or post-transcoder step.

The SEI message is decoded by the decoder, that can then select the DSPs to activate, modify or deactivate based on control information such as target energy profile or target minimum quality.

In the following, embodiments are described for specific DSPs, but these embodiments can be generalized to other DSPs than those discussed in the following.

Considering the conventional video coding standards (AVC, HEVC, VVC, EVC, AV1), the following DSPs are typically considered (with reference to step numbering of FIG. 3):
In-loop post-filtering (317): In general, different in-loop post-filters (Weak deblocking filters (WDBF), strong deblocking filter (SDBF), SAO edge offset, SAO band offset, ALF (adaptive loop filtering), CC-ALF (Cross-Component ALF)) apply successively in the decoding process specified by the above standards. In the following embodiments, these in-loop post-filtering process are named loopFilter[k], with k=1 to N, N being the number of loop filters potentially used in the decoding process. For example, N=5 when the use of the in-loop post-filters mentioned above is allowed (considering SAO edge offset, SAO band offset are in the same DSP).
inverse quantization (312)
inverse transform (313)
In some embodiments, other DSPs are also considered:
DSPs in the family of the inter prediction tools using weightings of at least one predictor (for example Bi-prediction (BiPred), weighting prediction (WP), BCW, LIC, CIIP, Geometric partitioning mode);
DSPs performing refinement of the prediction (Bi-directional optical flow, Decoder Motion Vector refinement, Prediction refinement with optical flow for inter blocks, Geometric partitioning mode for intra blocks;
DSPs in the family of content mapping (Luma mapping with chroma scaling (LMCS)).

Inverse mapping.

In some embodiments, the granularity for signaling the energy consumption and visual quality of a DSP that can be either modified or deactivated is signaled.

Depending on the signaled granularity, the decoder can select the DSPs that it modifies/deactivates for Granularity 1: temporal layers,
Granularity 2: pictures,
Granularity 3: some slices in the picture,
Granularity 4: some tiles in the picture,
Granularity 5: some Coding Tree Units in the picture,
Granularity 6: some Coding blocks size in the picture,
Granularity 7: some coding modes.

In a first embodiment, only the deactivation is possible during the decoding process for each considered DSP. In addition, in this embodiment, only the impact on energy consumed by the decoding process is considered. Table TAB1 below provides an example of syntax of SEI messages compliant with this first embodiment.

Table TAB1 provides a basic example of a syntax of SEI message providing the energy and quality information for the considered DSPs. In this example, three DSPs, noted dspx are considered (dsp1, dsp2 and dsp3). For example, dsp1 corresponds to the deblocking filter, dsp2 corresponds to the SAO and dsp3 corresponds to a combination of the inverse quantization and the inverse transform.

A syntax element period_type allows identifying a period of the video stream on which applies the SEI message. The concept of period can correspond to an Intra period, a Group of Pictures (GOP), a number of pictures, or a time duration.

TABLE TAB1

| Syntax |
|---|
| decoding_process_energy_quality_indication( payloadSize ) {<br>  period_type<br>  dsp1_info_indication<br>  if( dsp1_info_indication == 1 ) {<br>    dsp1_energy<br>    dsp1_quality<br>  }<br>  dsp2_info_indication<br>  if( dsp2_info_indication == 1 ) {<br>    dsp2_energy<br>    dsp2_quality<br>  }<br>  dsp3_info_indication<br>  if( dsp3_info_indication == 1 ) {<br>    dsp3_energy<br>    dsp3_quality<br>  }<br>} |

A syntax element dspx_info_indication (with x=1, 2 or 3) indicates if the SEI message comprises energy and quality information for the DSP dspx.

If dspx_info_indication is equal to "1", the SEI message contains a first syntax element dspx_quality and a second syntax element dspx_energy for the DSP dspx. Otherwise, if dspx_info_indication is equal to "0", the SEI message doesn't contain any energy nor quality information for the DSP dspx.

The syntax element dspx_energy indicates the energy impact for the decoder when the DSP dspx is not activated, i.e. indicates a reduction of the energy consumption of the decoding process compared to a default decoding process when the DSP dspx is deactivated. The default decoding process corresponds to the decoding process in which all DSPs activated during the encoding of a video stream (i.e. all DSPs considered in the SEI message) are also activated during the decoding of the coded video stream.

The syntax element dspx_quality indicates the quality impact for the decoder when the DSP dspx is not activated i.e. indicates a reduction of the quality of the decoded video compared to the quality of the decoded video resulting from the default decoding process when the DSP dspx is deactivated.

In a variant of the first embodiment, the information provided by the SEI message corresponds to a given granularity. Table TAB2 below provides an example of a syntax of a SEI message compliant with this variant of the first embodiment.

In the example of table TAB2, the energy and quality information are given per temporal layer and per coding mode.

A syntax element number_temp_layer indicates a number of temporal layers of the video stream considered in the SEI message. For example, in the test conditions used in JVET for VVC (http://phenix.int-evry.fr/jvet/doc_end_user/documents/13_Marrakech/wg11/JVET-M1010-v1.zip), in Random Access configuration, number_temp_layer=5.

A syntax element number_modes indicates a number of modes of the video stream considered in the SEI message. For example, num_modes=7. The seven modes correspond for example to five types of intra coding modes (for instance: planar, DC, horizontal/vertical, other directional modes, MIP), and two types of inter coding modes (for instance mono-directional inter prediction and bi-prediction).

For each DSP dspx considered in the SEI message, a value representative of an energy impact dspx_energy[t][c] and a value representative of a quality impact dspx_quality[t][c] is given for each possible couple of a temporal layer (or temporal id) t and a mode c when the DSP dspx is deactivated.

TABLE TAB2

| Syntax |
|---|
| decoding_process_energy_quality_indication( payloadSize ) {<br>  period_type<br>  number_temp_layers<br>  number_modes<br>  dsp1_info_indication<br>  if( dsp1_info_indication == 1 ) {<br>    for( t=0; t<number_temp_layers; t++ ) {<br>      for( c=0; c<number_modes; c++ ) {<br>        dsp1_energy [t] [c]<br>        dsp1_quality [t] [c]<br>      }<br>    }<br>  }<br>  dsp2_info_indication<br>  if( dsp2_info_indication == 1 ) {<br>    for( t=0; t<number_temp_layers; t++ ) {<br>      for( c=0; c<number_modes; c++ ) {<br>        dsp2_energy[t] [c]<br>        dsp2_quality[t] [c]<br>      }<br>    }<br>  }<br>  dsp3_info_indication<br>  if( dsp3_info_indication == 1 ) {<br>    for( t=0; t<number_temp_layers; t++ ) {<br>      for( c=0; c<number_modes; c++ ) {<br>        dsp3_energy[t] [c]<br>        dsp3_quality[t] [c]<br>      }<br>    }<br>  }<br>} |

Of course, other types of granularity taken in the list of granularities mentioned above could be considered. For example, the energy and quality information can be given per temporal layer (Granularity 1), pictures (Granularity 2), and coding modes (Granularity 6).

In a second embodiment, a DSP could be either modified or deactivated. Again, in this embodiment, only the impact on the decoding process is considered. Table TAB3 below provides an example of syntaxes of SEI messages compliant with this second embodiment.

TABLE TAB3

Syntax

```
decoding_process_energy_quality_indication( payloadSize ) {
  period_type
  number_temp_layers
  number_modes
  dsp1_info_indication
  dsp1_modifAuthorized
  if( dsp1_info_indication = = 1 ) {
    for( t=0; t<number_temp_layers; t++ ) {
      for( c=0; c<number_modes; c++ ) {
        dsp1_energy_deact[t] [c]
        dsp1_quality_deact[t] [c]
        If(dsp1_modifAuthorized) {
          dsp1_energy_modif[t] [c]
          dsp1_quality_modif[t] [c]
        }
      }
    }
  }
  dsp2_modifAuthorized
  if( dsp2_info_indication = = 1 ) {
    for( t=0; t<number_temp_layers; t++ ) {
      for( c=0; c<number_modes; c++ ) {
        dsp2_energy_deact[t] [c]
        dsp2_quality_deact[t] [c]
        If(dsp2_modifAuthorized) {
          dsp2_energy_modif[t] [c]
          dsp2_quality_modif[t] [c]
        }
      }
    }
  }
  dsp3_modifAuthorized
  if( dsp3_info_indication = = 1 ) {
    for( t=0; t<number_temp_layers; t++ ) {
      for( c=0; c<number_modes; c++ ) {
        dsp3_energy_deact[t] [c]
        dsp3_quality_deact[t] [c]
        If(dsp3_modifAuthorized) {
          dsp3_energy_modif[t] [c]
          dsp3_quality_modif[t] [c]
        }
      }
    }
  }
}
```

In the second embodiment, the syntax elements representative of the energy and quality information dspx_energy and dspx_quality of embodiment 1 are replaced by the syntax elements dspx_energy_deact and dspx_quality_deact representing the energy and quality impact in case of deactivation.

A syntax element dspx_modifAuthorized is used to indicate whether a DSP can be modified or not. If dspx_modifAuthorized is equal to "1", the process of the DSP dspx can be modified. In that case, the SEI message comprises a syntax element dspx_energy_modif and a syntax element dsp3_quality_modif for the DSP dspx. The syntax element dspx_energy_modif indicates the energy impact for the decoder when the DSP dspx is modified. The syntax element dspx_quality_modif indicates the quality impact for the decoder when the DSP dspx is modified. If dspx_modifAuthorized is equal to "0", the process of the DSP dspx cannot be modified. A DSP for which a modification is allowed is for example the deblocking filter. A possible modification of the deblocking filter allowing saving energy on the decoder side consists in replacing a strong deblocking filter by a weak deblocking filter when a strong deblocking filter is activated for a current block. Indeed the WDBF has a reduced complexity comparing to the SDBF thanks to using shorter filter length.

In a third embodiment, in addition to the impact on the decoding process, the energy impact of modifications of DSPs on the display process is also considered. Table TAB4 below provides an example of syntax of SEI messages compliant with this third embodiment.

In the example of table TAB4, only one DSP dsp1 is considered. However, the same syntax applies to any DSP dspx. A syntax element dspx_ImpactDisplay indicates if a modification of a DSP dspx has a significant impact on the energy consumed by a display device. If dspx_ImpactDisplay is equal to "1", the modification of the process of the DSP dspx has a significant impact on the energy consumed by a display device for displaying the decoded video. In that case, the SEI message comprises a syntax element dspx_energy_modif_display and a syntax element dspx_energy_deact_display. The syntax element dspx_energy_modif_display provides an information representative of an amount of energy reduction on the display device provided by the modification of the process of the DSP dspx. The syntax element dspx_energy_deact_display provides an information representative of an amount of energy reduction on the display device provided by the deactivation of the process of the DSP dspx. If dspx_ImpactDisplay is equal to "0", the modification or deactivation of the process of the DSP dspx has no significant impact of the energy consumed by the display device.

TABLE TAB4

Syntax

```
decoding_process_energy_quality_indication( payloadSize ) {
  period_type
  number_temp_layers
  number_modes
  dsp1_info_indication
  dsp1_modifAuthorized
  dsp1_ImpactDisplay
  if( dsp1_info_indication = = 1 ) {
    for( t=0; t<number_temp_layers; t++ ) {
      for( c=0; c<number_modes; c++ ) {
        dsp1_energy_deact[t] [c]
        dsp1_quality_deact[t] [c]
        If(dsp1_impactDisplay)
          dsp1_energy_deact_display[t] [c]
        If(dsp1_modifAuthorized) {
          dsp1_energy_modif[t] [c]
          dsp1_quality_modif[t] [c]
          If(dsp1_impactDisplay) {
            dsp1_energy_modif_display [t] [c]
          }
        }
      }
    }
  }
}
```

A DSP for which a modification of the process has an impact on the energy consumed by a display device displaying the decoded video stream is for example a DSP of the family of the inter prediction tools using weightings of at least one predictor (for example Bi-prediction (BiPred), weighting prediction (WP), BCW, LIC, CIIP).

When an image is displayed, one characteristic of this image has a significant impact on the energy consumed by the display device: the luminance of said image. A display device displaying an image with a low luminance consumes less than a display device displaying an image with a high luminance. The process of the DSP of the family of inter prediction tools using weightings of at least one predictor comprises at least one weighting step. For example, a predictor for bi-prediction is computed as follows:

$$biPred = (w_0 \cdot pred_0 + w_1 \cdot pred_1 + 1)/2$$

By controlling the weighting step, it is possible to control the luminance of the predictor. For example, in the bi-prediction case the luminance of the predictor can be controlled by adding a positive control factor x at the denominator:

$$biPred = (w_0 \cdot pred_0 + w_1 \cdot pred_1 + 1)/(2+x)$$

Consequently, when added to the residual of the block to be reconstructed, this predictor bipred with a controlled luminance value allows obtained a reconstructed block with a controlled luminance value. Since the control factor x is positive, the reconstructed block is displayed with a lower luminance value than the luminance value that would be obtained without applying the control factor x for obtaining the predictor bipred. In an embodiment the control factor x=2 when the bi-prediction reconstruction process is modified. A scaling factor can also be applied to the prediction residue. For instance a scaling factor equal to $(2/(2+x))$ could be used to keep the residue scaled the same way as the weighted prediction.

A similar approach could be applied on the reconstruction process of the weighted prediction mode. The equation allowing obtaining a predictor in the weighted prediction mode is modified as follows in the mono-prediction case:

$$pred(x,y) = ((w_0 \cdot pred_0(x,y) + (1 << (shift-1))) >> (shift+x)) + Off_0$$

and as follows in the bi-prediction case:

$$pred(x,y) = ((w_0 \cdot pred_0(x,y) + w_1 \cdot pred_1(x,y) + Off_{01}) >> (shift+1+x))$$

In an embodiment the control factor x=1 when the weighted prediction reconstruction process is modified.

A scaling factor can also be applied to the prediction residue in the case of weighted prediction mode in order to scale the residue in the same way the weighted prediction is scaled.

A similar approach could be also applied on the reconstruction process of the mode BCW. The equation allowing obtaining a predictor in the BCW mode is modified as follows:

$$pred(x,y) = ((8-w) \cdot pred_0(x,y) + w \cdot pred_1(x,y) + 4) >> (3+x)$$

In an embodiment the control factor x=1 when the BCW mode reconstruction process is modified.

A similar approach could be also applied on the reconstruction process of the mode LIC. The equation allowing obtaining a predictor in the LIC mode is modified as follows:

$$Pred_{corr}(x,y) = ((a \cdot Pred(x,y) + (1 << (shift-1))) >> (shift+x)) + b$$

In an embodiment the control factor x=1 when the LIC mode reconstruction process is modified.

A similar approach could be also applied on the reconstruction process of the mode CIIP. The equation allowing obtaining a predictor in the LIC mode is modified as follows:

$$P_{CIIP}(w_A \cdot P_{inter} + w_B \cdot P_{intra} + off) >> (shift+x)$$

In an embodiment the control factor x=1 when the CIIP mode reconstruction process is modified.

Similarly to the DSP of the family of the inter prediction tools using weightings of at least one predictor, it is also possible to control the luminance level of decoded pictures at the level of the inverse mapping 320. Indeed, instead of applying an inverse mapping process corresponding to the inverse of the mapping process of step 201, it is possible to modify the inverse mapping process so that the highest luminance levels are attenuated in the decoded images. For instance, the inverse mapping function IF(x), x being a sample value, can be modified in order to reduce the maximum mapped value, by applying a scaling factor to all inverse mapped values. For instance y=IF1(x), with IF1(x) defined as $(sc*IF(x)+2\textasciicircum(s-1))/2\textasciicircum s$, where "^" is the "power" operator, s is a shift value and sc is a scaling factor, expected to be in the interval] 0, $2\textasciicircum(s-1)$ [.

As can be seen from the above embodiments of SEI messages, the SEI messages of tables TAB1, TAB2, TAB3 and TAB4 comprises for each DSP of a plurality of DSPs used for encoding the original video data, information representative of an energy consumed by a device in charge of decoding and/or displaying the encoded video data induced by said DSP and information representative of an impact of said DSP on a quality of the encoded video data after decoding. More precisely, for each DSP, the information representative of the energy consumed is representative of an amount of reduction of the energy consumed by a decoding device and/or a display device induced by a deactivation or a modification of said DSP during the decoding process. The information representative of the quality is representative of an amount of reduction of the quality of the decode images induced by a deactivation or a modification of said DSP during the decoding process.

Figure 5:
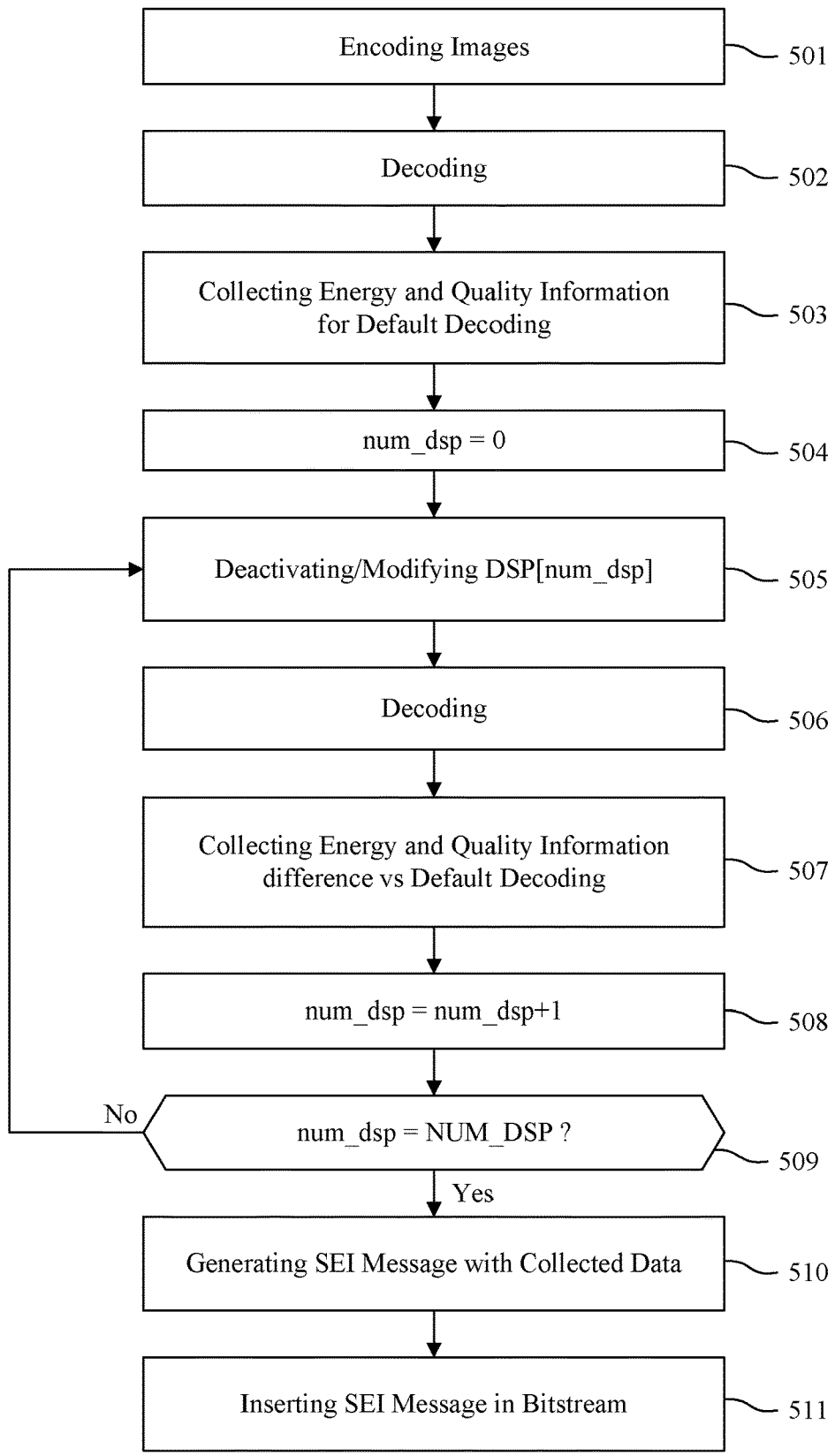
FIG. 5 illustrates schematically an example of method for generating SEI messages; and, FIG. 6 represents schematically a method using information contained in SEI messages to control a decoding and/or a display process.

Until now, we have described a plurality of embodiments of a syntax of SEI messages allowing a decoding device to control the energy consumed by the decoding and/or the displaying process. In FIG. 5, we describe how these SEI messages are generated and in FIG. 6, how a decoder is using the information contained in these SEI message.

FIG. 5 illustrates schematically an example of method for generating SEI messages.

In the example of FIG. 5, the method for generating SEI messages is executed by a processing module 30 comprised in the apparatus 1 of FIG. 4A and implementing also the method for encoding of FIG. 2. In an embodiment, the method of FIG. 5 is executed on a set of consecutive pictures of an original video sequence and allows obtaining a SEI message corresponding to said set of pictures. However, it is also possible to apply the method of FIG. 5 to one picture of the original video sequence. In that case, the set of pictures comprises only one picture. When generated, the SEI message is inserted in the video stream along with the pictures of the corresponding set of pictures. If other sets of pictures are defined for the original video data, a SEI message is computed for each set. In an embodiment, a set of pictures comprises a resynchronization picture and all images following the resynchronization picture until a next resynchronization picture. The next resynchronization picture represents a start of a next period.

In a step 501, the processing module 30 encodes the set of pictures in an encoded video stream 210 applying the method for encoding of FIG. 2.

In a step 502, the processing module 30 decodes the encoded video stream 210 applying the method of FIG. 3 to obtain decoded pictures.

In a step 503, the processing module 30 collects energy consumption and quality information for each DSP considered in the SEI message. The quality information is for example an average PSNR (Peak Signal to Noise Ratio) computed on the set of pictures between the pictures of the original video sequence and the corresponding decoded pictures obtained in step 502. Other examples are the MS-SSIM disclosed in document (Wang, Z.; Simoncelli, E. P.; Bovik, A. C (2004), "Multiscale structural similarity for image quality assessment", ACSSC Conference) and VMAF disclosed in document (Zhi Li et al (2016), "Toward A Practical Perceptual Video Quality Metric", Netflix Tech-Blog, June 6) quality metrics. The energy consumption for decoding a video stream can be measured for instance as described in the document "JVET-P0084 Decoding Energy Assessment of VTM-6.0", using an external power meter connected to the decoding device. Another possibility to measure the energy demand of the decoding process without an external power meter is "Running Average Power Limit" (RAPL), which is an integrated power meter within modern Intel CPUs (see "K. N. Khan, M. Hirki, T. Niemi, J. K. Nurminen, and Z. Ou. RAPL in Action: Experiences in Using RAPL for Power Measurements, ACM Trans. Model. Perform. Eval. Comput. Syst. 3(2), 9:1-9:26, March 2018." and "S. Labassan, J. Shafer, R. Goldstone, B. Rountree, Intel Running Average Power Limit Technology", http://ix.cs.uoregon.edu/~slabasan/webdocs/posters/InteRAPL SC12.pdf). Alternatively, the decoding runtime is measured, with the hypothesis that there is a linear link between the decoding runtime and the energy consumption.

In a step 504, the processing module 30 initializes a variable num_dsp to zero. In an embodiment, the variable num_dsp is used to browse the DSPs that can be deactivated and/or modified during the decoding process. In other words, each value of num_dsp correspond to a deactivation or a modification of a DSP. For example:

dsp_num=0 corresponds to a deactivation of the DBF;
dsp_num=1 corresponds to a modification of the DBF transforming a SDBF into a WDBF;
dsp_num=2 corresponds to a deactivation of SAO;
dsp_num=3 corresponds to a deactivation of the inverse transform;
dsp_num=4 corresponds to a deactivation of the inverse quantization;
dsp_num=5 corresponds to a deactivation of SAO;
dsp_num=6 corresponds to a modification of bi-prediction intended to reduce the luminance of the displayed pictures as described above in relation to the third embodiment of the SEI message;
dsp_num=7 corresponds to a modification of weighted prediction intended to reduce the luminance of the displayed pictures as described above in relation to the third embodiment of the SEI message;
dsp_num=8 corresponds to a modification of BCW intended to reduce the luminance of the displayed pictures as described above in relation to the third embodiment of the SEI message;
dsp_num=9 corresponds to a modification of LIC intended to reduce the luminance of the displayed pictures as described above in relation to the third embodiment of the SEI message;
dsp_num=10 corresponds to a modification of CIIP intended to reduce the luminance of the displayed pictures as described above in relation to the third embodiment of the SEI message.
dsp_num 11 corresponds to a modification of the inverse mapping of step 320 intended to attenuate the highest luminance values in the displayed pictures comparing to the luminance of the original pictures as described above in relation to the third embodiment of the SEI message.

In a step 505, the processing module 30 deactivates or modifies a DSP in function of the value of dsp_num. The DSP is deactivated or modified in function of an expected granularity of the SEI message. In an embodiment, the granularity of the SEI message is fixed. For example, the DSP is deactivated or modified only for the upmost temporal layer.

In a step 506, the processing module 30 decodes the encoded video stream using the method of FIG. 3 wherein the DSP corresponding to dsp_num is deactivated or modified in function of the value of dsp_num.

In a step 507, the processing modules 30 collects information representative of the difference between the decoding process applied in step 502 and the decoding process applied in step 506 in terms of energy consumed and in terms of quality of the displayed pictures. For example, the information representative of the difference between the default decoding process of step 502 and the modified decoding process of step 506 in terms of energy consumed is a percentage of energy consumption reduction comparing to the default decoding process. This percentage of energy reduction is used to set the value of the syntax elements dspx_energy_modif and dspx_energy_deact in the SEI message of tables TAB1, TAB2, TAB3 and TAB4. The information representative of the difference between the default decoding process and the modified decoding process in terms of quality of the displayed pictures is a percentage of quality reduction comparing to the default decoding process. This percentage of quality reduction is used to set the value of the syntax element dspx_quality_modif and dspx_quality_deact in the SEI message of tables TAB1, TAB2, TAB3 and TAB4.

In a step 508, the processing module 30 increments the variable dsp_num of one unit.

In a step 509, the processing module 30 compares the variable dsp_num to a value NUM_DSP representing a number of deactivation or modification of DSP considered in the SEI message. In the example above, NUM_DSP=12.

If num_dsp<NUM_DSP, the processing module 30 returns to step 505. Otherwise, the processing module 30 executes a step 510. During step 510, the processing module 30 generates a SEI message as described in the first, second or third embodiments of the SEI message with the collected energy and quality information.

In a step 511, the processing module 30 inserts the generated SEI message into the encoded video stream 210.

In a variant of the method of FIG. 5 compliant with the SEI message of table TAB2, the steps 506 and 507 are executed for a plurality of granularity levels. In the example of the SEI message of table TAB2, the SEI message comprises a quality information dspx_quality and an energy information dspx_energy for a number number_temp_layers of temporal layers and a number num_modes of modes. In order to generate this SEI message, the processing module 30 executes the steps 506 and 507 for each possible combination of a temporal layer and a mode.

In a variant of the method of FIG. 5 compliant with the SEI message of table TAB4, the processing module 30 takes into account the effects of the deactivations or modifications of the DSP on the energy consumed by the decoding device. To do so, during step 503, the processing module collects an information representative of the energy consumed by a display device when displaying the pictures decoded during step 502. An external power meter can be used to measure the energy consumption of the display. In an embodiment, it is considered that an average luminance of the pictures obtained in step 502 is an information representative of the energy consumed by a display device. Hence, in step 502, the processing module computes an average of the luminance of the picture obtained during step 502. During step 507, the processing module 30 computes an average of the luminance of the pictures obtained during step 506. Then during step 507, the processing module 30 computes an information representative of the reduction of the energy consumed by a display device. In an embodiment, it is considered that a percentage of the reduction of the luminance between the average luminance computed in step 502 and the average luminance computed in step 507 is representative of the reduction of the energy consumed by a display device. Consequently, the processing module 30 computes this percentage in step 507. This percentage is used to set the value of the syntax element dspx_energy_modif_display in the SEI message of table TAB4.

Figure 6:
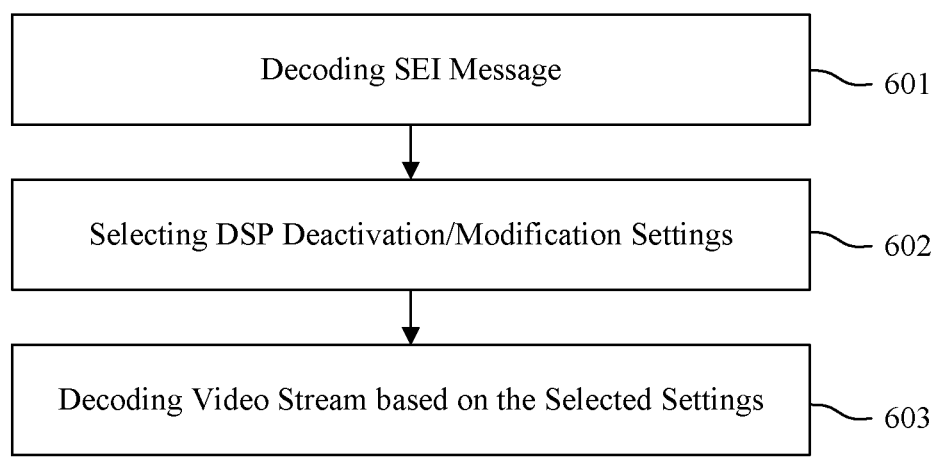

FIG. 6 represents schematically a method using information contained in SEI messages to control a decoding and/or a display process.

The method of FIG. 6 is executed by a processing module 30 comprised in the system 3 of FIG. 4A also implementing the method for decoding of FIG. 3. The method of FIG. 6 is executed when a SEI message is received with an encoded video stream comprising a set of pictures corresponding to said SEI message.

In a step 601, the processing module 30 receives at least one bitstream comprising an encoded video stream comprising the set of pictures and a SEI message and decodes the SEI message.

If the SEI message of table TAB1 is received, the processing module 30 obtains an information representative of a reduction of the energy consumed by the decoding process dspx_energy and an information representative of a quality reduction dspx_quality for each DSP dspx that can be deactivated during the decoding process.

If the SEI message of Table TAB2 is received, the processing module 30 obtains an information representative of a reduction of the energy consumed by the decoding process dspx_energy and an information representative of a quality reduction dspx_quality for each possible combination of types of granularity for each DSP dspx that can be deactivated during the decoding process.

If the SEI message of Table TAB3 is received, the processing module 30 obtains an information representative of a reduction of the energy consumed by the decoding process dspx_energy and an information representative of a quality reduction dspx_quality for each possible combination of types of granularity for each DSP dspx that can be deactivated or modified during the decoding process.

If the SEI message of table TAB4 is received, in addition to the information provided by the SEI message of table TAB 3, the processing module 30 obtains an information representative of a reduction of the energy consumed by a display device dspx_energy_modif_display for each possible combination of types of granularity for each DSP dspx for which a modification of the DSP process has a significant impact on the energy consumed by the display device.

In a step 602, the processing module 30 uses the information comprised in the decoded SEI message to determine if some DSP(s) have to be deactivated or modified and if yes, to determine (i.e. to select) which DSP(s) to deactivate or modify.

In an embodiment the processing modules 30 receives a target percentage of reduction of energy consumed by the decoding and/or the display device and determines the combination of deactivated/modified DSPs allowing obtaining this target reduction with the best possible quality. In an embodiment, provided the number of combinations of deactivation/modification of DSP is low, the processing module tests exhaustively all possible combinations of deactivation/modification of DSP to find the combination maximizing the quality. In an embodiment, the target percentage of energy reduction is given by a user of the system 3. In another embodiment, the target percentage of energy reduction is provided by the system 3 and/or by the display system 5 in function of a status of a battery of said systems.

In an embodiment the processing modules 30 receives a target percentage of quality reduction of the decoded video data and determines the combination of deactivated/modified DSPs allowing obtaining this target quality with the lowest possible energy consumption. In an embodiment, the target percentage of quality reduction is given by a user of the system 3. In another embodiment, the target percentage of quality reduction is provided by the system 3 and/or by the display system 5 in function of a status of a battery of said systems.

In a step 603, the processing module 30 decodes the encoded video stream by applying the decoding process of FIG. 3 wherein the DSPs determined in step 602 are deactivated or modified.

We described above a number of embodiments. Features of these embodiments can be provided alone or in any combination. Further, embodiments can include one or more of the following features, devices, or aspects, alone or in any combination, across various claim categories and types:

- A bitstream or signal that includes one or more of the described syntax elements, or variations thereof.
- Creating and/or transmitting and/or receiving and/or decoding a bitstream or signal that includes one or more of the described syntax elements, or variations thereof.
- A TV, set-top box, cell phone, tablet, or other electronic device that performs at least one of the embodiments described.
- A TV, set-top box, cell phone, tablet, or other electronic device that performs at least one of the embodiments described, and that displays (e.g. using a monitor, screen, or other type of display) a resulting image.
- A TV, set-top box, cell phone, tablet, or other electronic device that tunes (e.g. using a tuner) a channel to receive a signal including an encoded video stream, and performs at least one of the embodiments described.
- A TV, set-top box, cell phone, tablet, or other electronic device that receives (e.g. using an antenna) a signal over the air that includes an encoded video stream, and performs at least one of the embodiments described.

The invention claimed is:

1. A method comprising:
   obtaining video data comprising a message, said message comprising:
   for a first coding tool specified in the video data, first information representative of at least one of an estimate of an energy consumed for decoding the video data responsive to applying said first coding tool, wherein the estimate comprises an amount of reduction of an energy consumed for decoding the video data responsive to said first coding tool being modified, and an estimate of an energy consumed for displaying a result of a decoding of the video data responsive to applying said first coding tool, wherein the estimate comprises an amount of reduction of an energy consumed for displaying a result of the decoding of the video data responsive to said first coding tool being modified; and second information representative of an impact of said first coding tool on a quality of the result of the decoding of the video data, wherein, responsive to the first coding tool being modified, the impact comprises an amount of reduction of a quality of the result of the decoding of the video data;

determining whether to modify the first coding tool based on at least one of the first information and the second information; and decoding the video data based on the determination.

2. The method according to claim 1, wherein the first and the second information are provided for at least a sub-part of the video data corresponding to at least one temporal layer and/or at least one picture and/or at least one slice in a picture and/or at least one tile in a picture and/or at least one block of pixels in a picture and/or at least one block of a picture encoded according to a predetermined coding mode.

3. The method according to claim 1, wherein the first information is representative of at least one of an amount of reduction of an energy consumed for decoding the video data responsive to said first coding tool being deactivated, an amount of reduction of an energy consumed for decoding the video data responsive to said first coding tool being activated in a modified form, an amount of reduction of an energy consumed for displaying a result of the decoding of the video data responsive to said first coding tool being deactivated, and an amount of reduction of an energy consumed for displaying a result of the decoding of the video data responsive to said first coding tool being activated in a modified form, and the second information is representative of at least one of an amount of reduction of a quality of the result of the decoding of the video data responsive to said first coding tool being deactivated and an amount of reduction of a quality of a result of the decoding of the video data responsive to said first coding tool being activated in a modified form.

4. The method according to claim 1, wherein the first information is representative of at least one of an amount of reduction of an energy consumed for decoding the video data responsive to said first coding tool being deactivated and an amount of reduction of an energy consumed for decoding the video data responsive to said first coding tool being activated in a modified form, and the second information is representative of an amount of reduction of an energy consumed for displaying a result of the decoding of the video data responsive to said first coding tool being deactivated and an amount of reduction of an energy consumed for displaying the result of the decoding of the video data responsive to said first coding tool being activated in a modified form.

5. The method according to claim 1, wherein each coding tool belongs to a plurality of coding tools comprising a deblocking filter, a SAO, coding tools of the family of tools using weightings of at least one predictor, and inverse mapping.

6. A device comprising electronic circuitry adapted for:
receiving video data comprising a message, said message comprising:

for a first coding tool specified in the video data, first information representative of at least one of an estimate of an energy consumed for decoding the video data responsive to applying said first coding tool, wherein the estimate comprises an amount of reduction of an energy consumed for decoding the video data responsive to said first coding tool being modified, and an estimate of an energy consumed for displaying a result of the decoding of the video data responsive to applying said first coding tool, wherein the estimate comprises an amount of reduction of an energy consumed for displaying a result of the decoding of the video data responsive to said first coding tool being modified; and second information representative of an impact of said first coding tool on a quality of the result of the decoding of the video data, wherein, responsive to the first coding tool being modified, the impact comprises an amount of reduction of a quality of the result of the decoding of the video data;

determining whether to modify the first coding tool based on at least one of the first information and the second information; and decoding the video data based on the determination.

7. The device according to claim 6, wherein the first and the second information are provided for at least a sub-part of the video data corresponding to at least one temporal layer and/or at least one picture and/or at least one slice in a picture and/or at least one tile in a picture and/or at least one block of pixels in a picture and/or at least one block of a picture encoded according to a predetermined coding mode.

8. The device according to claim 6, wherein the first information is representative of at least one of an amount of reduction of an energy consumed for decoding the video data responsive to said first coding tool being deactivated, an amount of reduction of an energy consumed for decoding the video data responsive to said first coding tool being modified, an amount of reduction of an energy consumed for displaying a result of the decoding of the video data responsive to said first coding tool is deactivated and an amount of reduction of an energy consumed for displaying a result of the decoding of the video data responsive to said first coding tool is activated in a modified form, and the second information is representative of at least one of an amount of reduction of a quality of the result of the decoding of the video data responsive to said first coding tool being deactivated and an amount of reduction of a quality of the result of the decoding of the video data responsive to said first coding tool being activated in a modified form.

9. The device according to claim 6, wherein the first information is representative of at least one of an amount of reduction of an energy consumed for decoding the video data responsive to said first coding tool being deactivated and an amount of reduction of an energy consumed for decoding the data responsive to said first coding tool is activated in a modified form, and the second information is representative of at least one of an amount of reduction of an energy consumed for displaying the video data responsive to said first coding tool being deactivated and an amount of reduction of an energy consumed for displaying the video data responsive to said first coding tool being activated in a modified form.

10. The device according to claim 6, wherein each coding tool belongs to a plurality of coding tools comprising a deblocking filter, a SAO, coding tools of the family of tools using weightings of at least one predictor, and inverse mapping.

11. A method comprising:
   encoding video data;
   generating a message comprising:
      for a first coding tool used for encoding the video data, first information representative of at least one of an estimate of an energy consumed for reconstructing the encoded video data responsive to applying the first coding tool, wherein the estimate comprises an amount of reduction of an energy consumed for reconstructing the encoded video data responsive to said first coding tool being modified, and an estimate of an energy consumed for displaying a result of a reconstruction of the encoded video data responsive to applying said first coding tool, wherein the estimate comprises an amount of reduction of an energy consumed for displaying a result of the reconstruction of the encoded video data responsive to said first coding tool being modified; and
      second information representative of an impact of said first coding tool on a quality of the result of the reconstruction of the encoded video data, wherein, responsive to the first coding tool being modified, the impact comprises an amount of reduction of a quality of the result of the reconstruction of the encoded video data; and
   inserting the generated message into the video data.

12. A device comprising electronic circuitry adapted for:
   encoding video data;
   generating a message comprising:
      for a first coding tool used for encoding the video data, information representative of at least one of an estimate of an energy consumed for reconstructing the encoded video data responsive to applying said first coding tool, wherein the estimate comprises an amount of reduction of an energy consumed for reconstructing the encoded video data responsive to said first coding tool being modified, and an estimate of an energy consumed for displaying a result of the reconstruction of the encoded video data responsive to applying said first coding tool, wherein the estimate comprises an amount of reduction of an energy consumed for displaying a result of the reconstruction of the encoded video data responsive to said first coding tool being modified; and
      second information representative of an impact of said first coding tool on a quality of the result of the reconstruction of the encoded video data, wherein, responsive to the first coding tool being modified, the impact comprises an amount of reduction of a quality of the result of the reconstruction of the encoded video data; and
   inserting the generated message into the video data.

13. A non-transitory information storage medium storing program code instructions for implementing the method according to claim 1.

14. The method according to claim 1, wherein the message comprises a first information and a second information for at least one second coding tool.

15. The device according to claim 6, wherein the message comprises a first information and a second information for at least one second coding tool.

16. A non-transitory information storage medium storing program code instructions for implementing the method according to claim 11.

* * * * *